(12) United States Patent
Yoffe

(10) Patent No.: US 9,637,245 B2
(45) Date of Patent: May 2, 2017

(54) POINT TAKE-OFF AND LANDING OF UNMANNED FLYING OBJECTS

(71) Applicant: Meir Yoffe, Holon (IL)

(72) Inventor: Meir Yoffe, Holon (IL)

( * ) Notice: Subject to any disclaimer, the term of this patent is extended or adjusted under 35 U.S.C. 154(b) by 61 days.

(21) Appl. No.: 14/401,430

(22) PCT Filed: Apr. 23, 2013

(86) PCT No.: PCT/IL2013/050351
§ 371 (c)(1),
(2) Date: Nov. 14, 2014

(87) PCT Pub. No.: WO2013/171735
PCT Pub. Date: Nov. 21, 2013

(65) Prior Publication Data
US 2015/0129716 A1 May 14, 2015

(30) Foreign Application Priority Data

May 16, 2012 (IL) .......................................... 219836

(51) Int. Cl.
*B64F 1/02* (2006.01)
(52) U.S. Cl.
CPC .......... *B64F 1/02* (2013.01); *B64C 2201/182* (2013.01)
(58) Field of Classification Search
CPC ....................................................... B64F 1/02
See application file for complete search history.

(56) References Cited

U.S. PATENT DOCUMENTS 4,790,497 A 12/1988 Yoffe
7,219,856 B2 5/2007 Watts et al.
(Continued)

FOREIGN PATENT DOCUMENTS

AU 2009200804 3/2009
AU 2009201713 5/2009
(Continued)

OTHER PUBLICATIONS

International Search Report for PCT/IL2013/050351, mailed Aug. 12, 2013.

*Primary Examiner* — Christopher P Ellis
*Assistant Examiner* — Jessica Wong
(74) *Attorney, Agent, or Firm* — McDonnell Boehnen Hulbert & Berghoff LLP

(57) ABSTRACT

Point take-off and landing systems for an unmanned flying object. In one embodiment, the flying object is guided along a flight trajectory and approaches a landing body such that a latching element, coupled with a suspension cable suspended from the flying body, latches with a receiving latch, coupled with an extendable retractable beam projecting horizontally from a landing body side surface. A cable release/retraction mechanism engages and then releases/retracts the suspension cable. The beam is as maneuvered to haul the flying object onto a landing surface. In another embodiment, the flying object is guided along a flight trajectory and approaches a landing body such that a latching element, coupled with a suspension cable suspended from the flying body, latches with a receiving cable, supported by cable supports projecting vertically from a landing body top surface. A cable release/retraction mechanism releases/retracts the suspension cable, hauling the flying object onto the landing surface.

14 Claims, 25 Drawing Sheets

(56) References Cited

U.S. PATENT DOCUMENTS

2005/0133665 A1* 6/2005 Dennis .................. B64C 25/68
 244/110 E
2009/0294584 A1 12/2009 Lovell et al.

FOREIGN PATENT DOCUMENTS

| EP | 2186728 | 5/2010 |
| RU | 2090459 | 9/1997 |
| RU | 2132293 | 6/1999 |
| WO | 2007/086055 | 8/2007 |

* cited by examiner

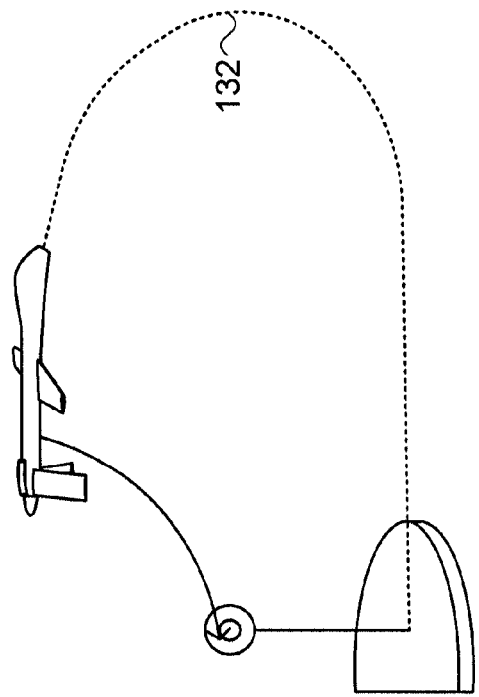
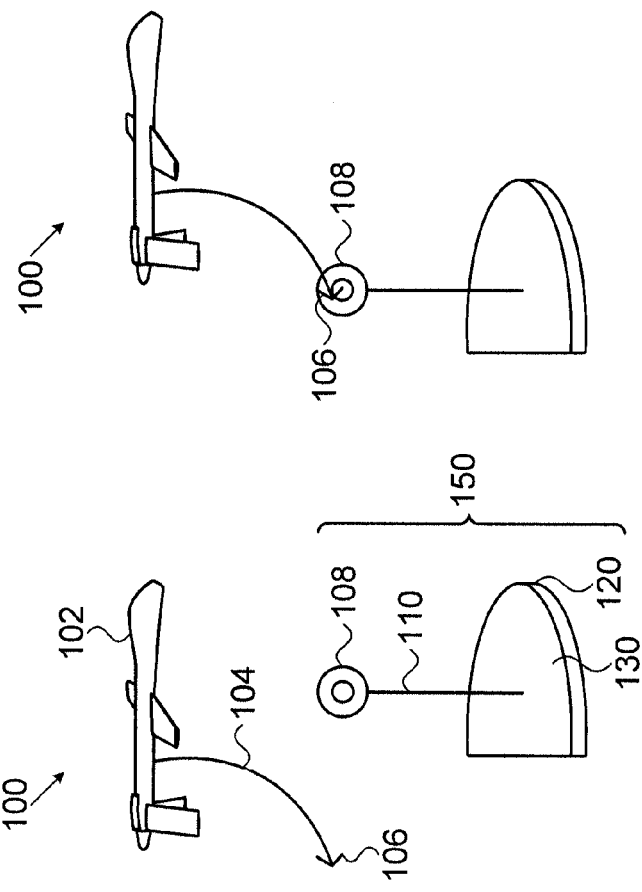
FIG. 1C          FIG. 1B          FIG. 1A

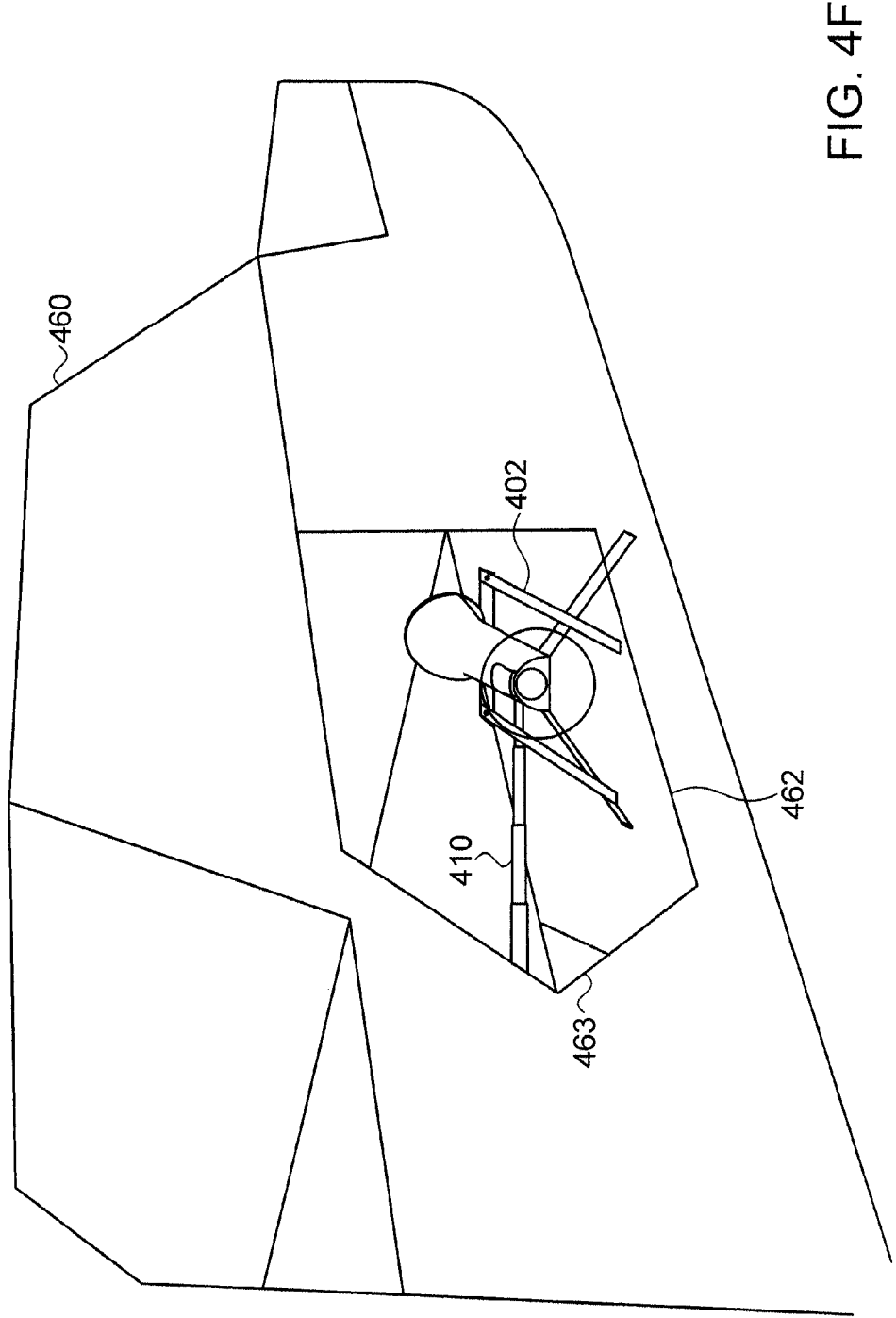

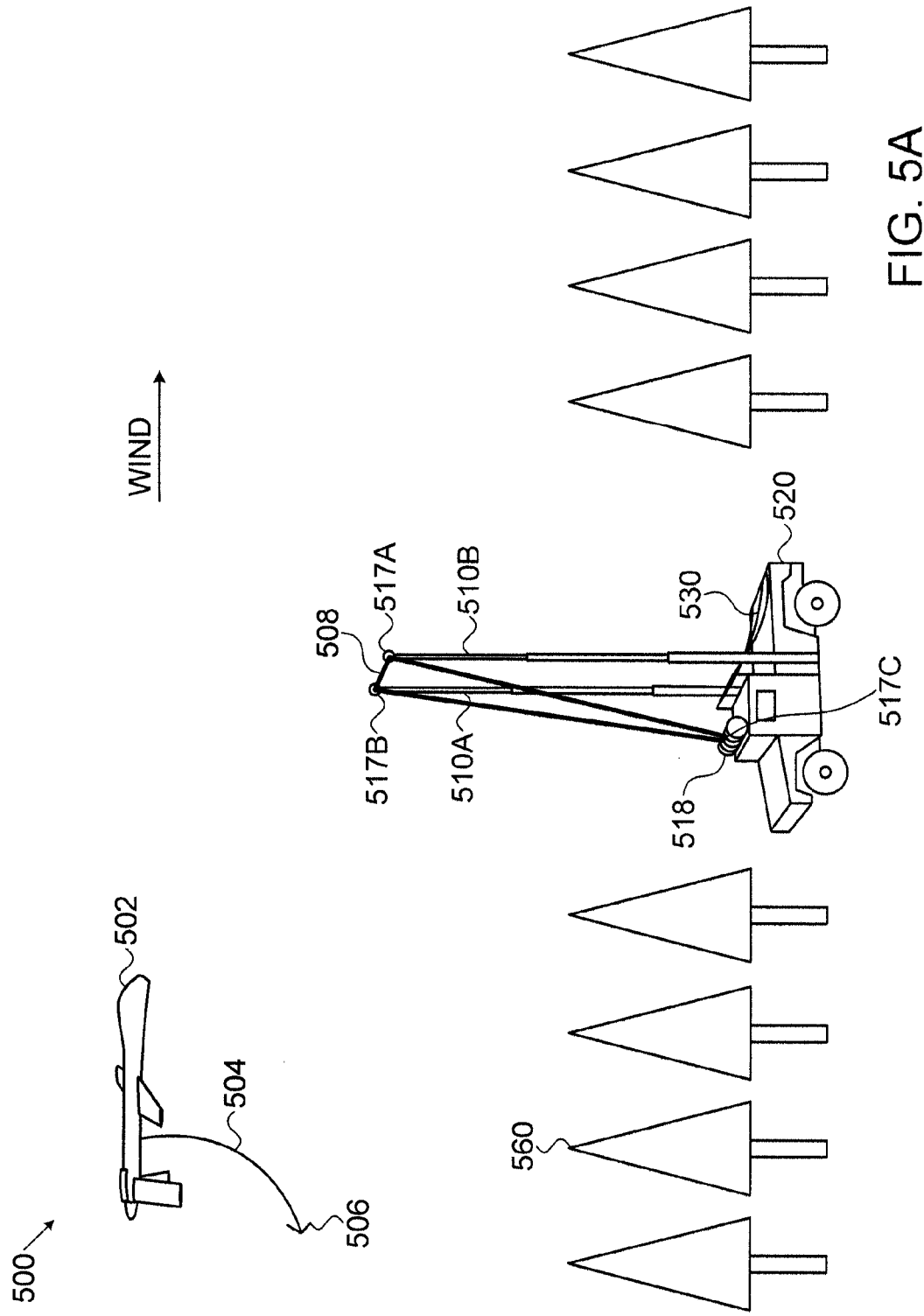

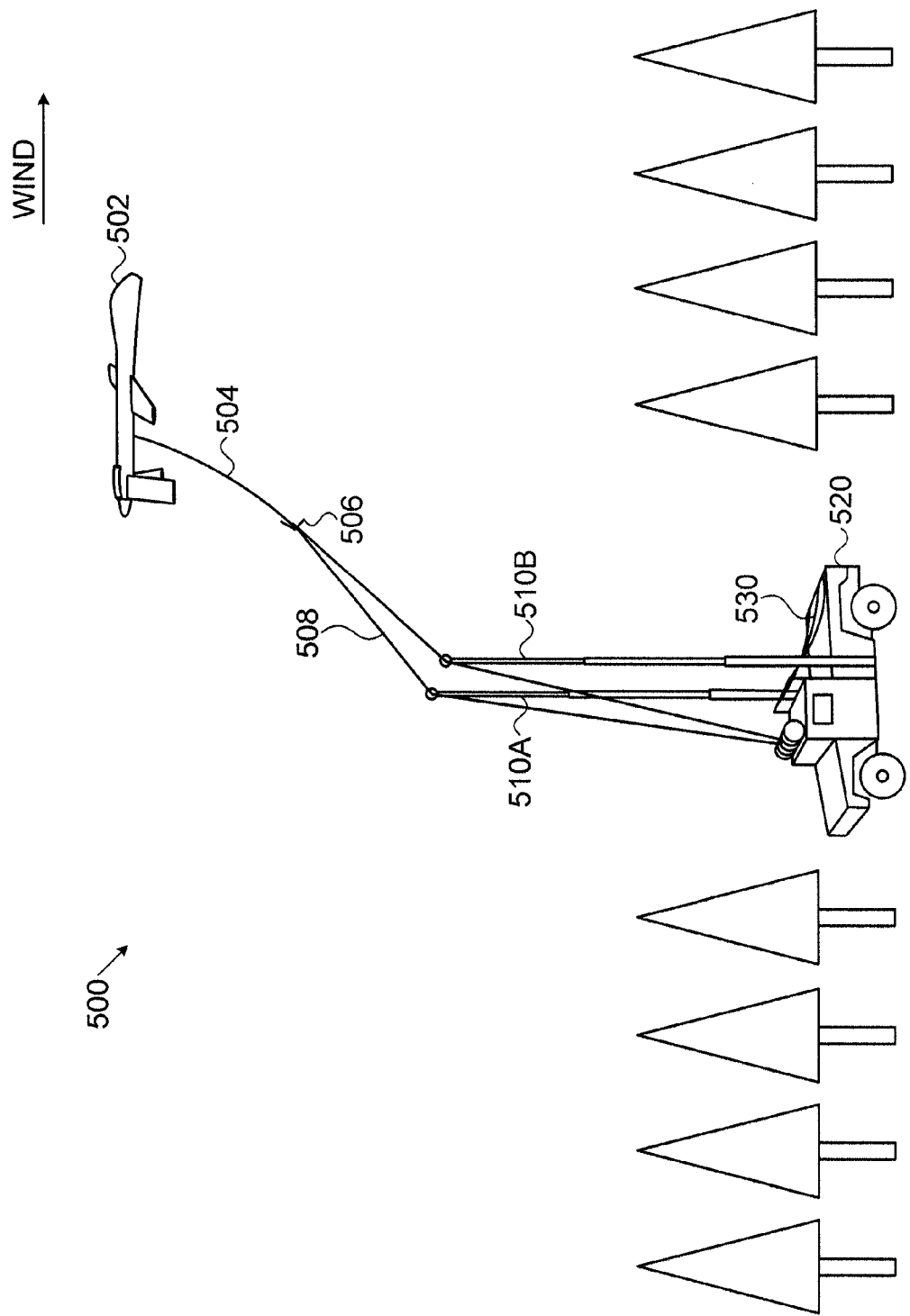

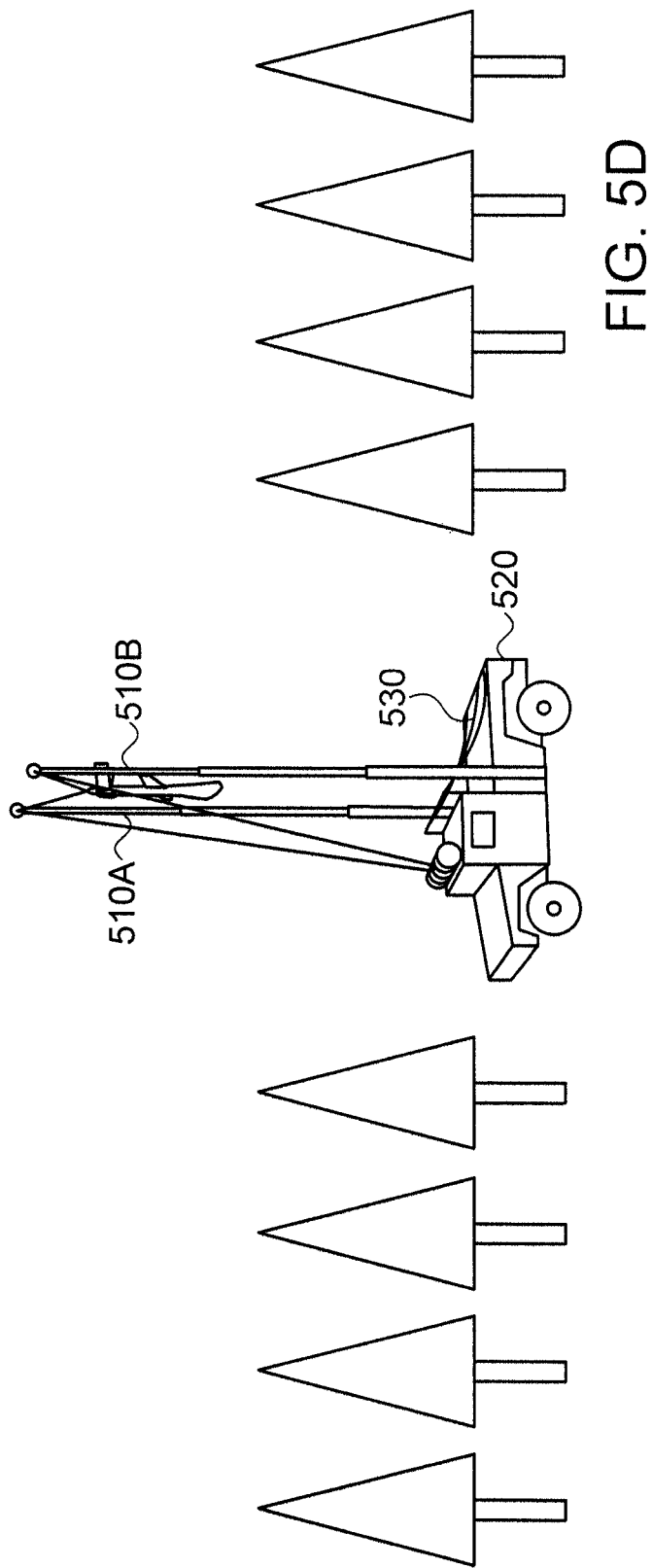

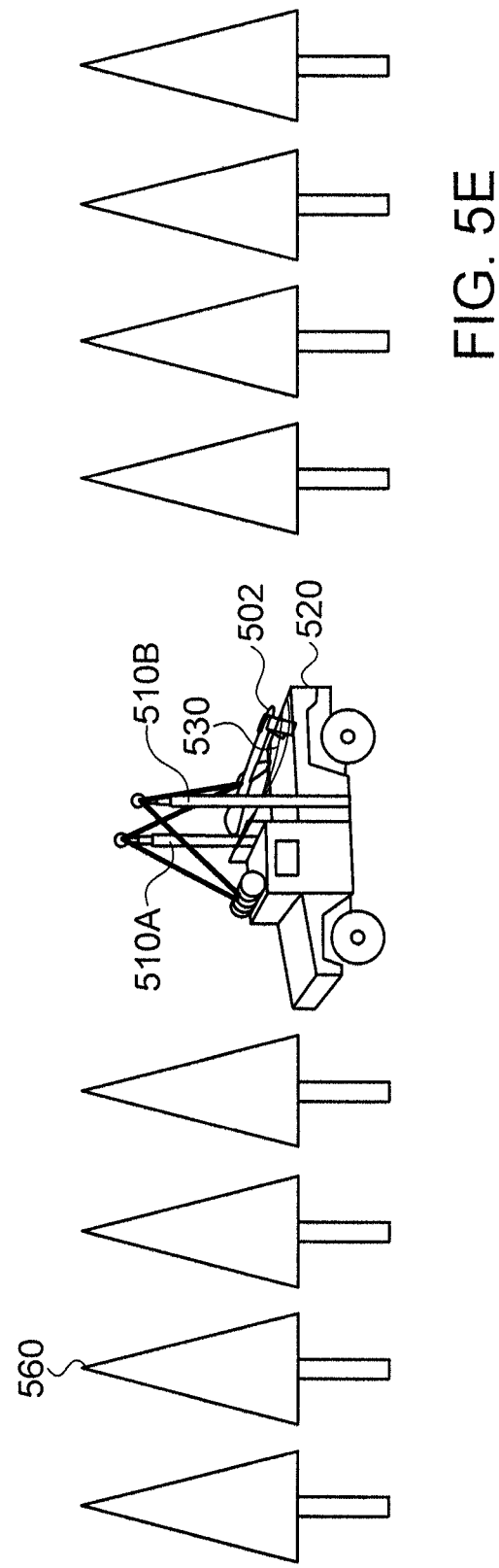

POINT TAKE-OFF AND LANDING OF UNMANNED FLYING OBJECTS

This application is a U.S. national phase of International Application No. PCT/IL2013/050351 filed on Apr. 23, 2013, which claims benefit of Israel Application Serial No 219836, filed May 16, 2012, both of which are incorporated by reference herein in their entirety.

FIELD OF THE DISCLOSED TECHNIQUE

The disclosed technique relates to systems and methods for point take-off and landing (PTOL) of unmanned flying objects, such as unmanned aerial vehicles (UAVs), onto a confined landing surface associated with a landing body.

BACKGROUND OF THE DISCLOSED TECHNIQUE

Point take-off and landing (PTOL) relates to the capabilities of unmanned aerial vehicles (UAVs) and other aircrafts to perform take-off and landing operations without a runway at a confined location. In today's high spending UAV military market, there is a lack of good solutions for enabling PTOL of UAVs. One specific example is the recovery of large-wingspan fixed-wing UAVs onto moving vehicles on land or on water. The large wingspans of these UAVs complicates the ability to land onto a ship or similar aquatic vessel, which may be subject to large amplitude and rapid angular movements along its roll, pitch and yaw axes. The difficulty for safe UAV landing may be further exacerbated by the ship's masts and antennas and by the turbulence behind the ship superstructure. Besides the lack of a runway, PTOL of a UAV onto (or from) a land vehicle may also be complicated by the presence of obstacles in the vicinity of the vehicle, by strong winds, and by darkness or low-visibility weather conditions.

The need for UAV recovery onto a ship has a long history. In 1985, Floyd Kennedy of the AIL Corporation discussed the need for fleet-integral UAVs to provide Airborne Early Warning (AEW) to U.S. Navy non-aviation task forces. The solution was observed to lie with fixed-wing UAVs due to their endurance capabilities, raising issues for point landing of such UAVs onto small ships (i.e., non-aircraft carriers), such as the concern that their long wings may interfere with the ship deck elements. Especially noteworthy is the U.S. Congress defined requirement for "Endurance Category" UAVs (i.e., which are capable of remaining airborne for long durations) for U.S. Navy ships, in the first "UAV Masterplan" of 1988, although no such system appears to have been deployed as of yet. One problem is that fixed-wing UAVs and other similar flying objects cannot hover like a helicopter while connecting to a ship's cable, so the U.S. Navy's RAST (Recovery Assist & Transfer) system solution for helicopters cannot be used. Additionally there is a need to cope with turbulence behind the ship's superstructure, wind-over-deck from all directions and at various intensities, and darkness or low-visibility weather conditions.

U.S. Pat. No. 7,219,856 to Watts, entitled "UAV recovery system" discloses an embodiment where a UAV system is coupled to the deck of a sea faring vessel. The UAV capture system includes a single arresting line that is supported by a stanchion, which may be disposed on a rotatable boom. The UAV hooks onto the line and is abruptly stopped in flight and once stopped it appears to be left hanging, which may cause damage to the UAV.

Australian Patent Application No. 2009200804 to Kariv, entitled "An unmanned aerial vehicle launching and landing system" discloses an embodiment relating to a system for landing UAVs. The system comprises an arm based structure and an axis means installed along the arm of the structure, enabling the arm to move around it. The arm is propelled into rotational motion around the axis from the instant that the UAV connects to landing arm. It appears that the rotational momentum of UAVs, especially heavier ones, may apply a taxing force onto the rotational axis.

SUMMARY OF THE DISCLOSED TECHNIQUE

In accordance with one aspect of the disclosed technique, there is thus provided a PTOL system for an unmanned flying object. The PTOL system includes a suspension cable, a latching element, a beam, a receiving latch, and a cable release/retraction mechanism. The suspension cable is suspended from the flying object. The latching element is coupled with the suspension cable. The beam projects horizontally from a side surface of a landing body, and is extendable and retractable. The receiving latch is coupled with the beam. The cable release/retraction mechanism is operative for releasing and/or retracting the suspension cable or a retraction cable coupled with the latching element. The flying object is guided along at least one flight trajectory, the flying object approaching the landing body such that the latching element latches with the receiving latch and the cable release/retraction mechanism engages the suspension cable, following which the cable release/retraction mechanism releases and/or retracts the suspension cable and the beam is maneuvered to haul the flying object onto a landing surface at the landing body. The beam may be stabilized, to minimize relative motion of the beam resulting from motion of the landing body. The landing body may be an aquatic vessel. The beam may be pivotable about at least one axis. The landing surface may be pivotable about at least one axis. The beam may be inclined at an angle to facilitate the latching of the latching element with the receiving latch. The PTOL system may further include an elevator, operative for transporting the flying object within the landing body. The landing body may include a stowage compartment, operative for stowing away the flying object after landing. The landing body may include at least one door, through which the beam is projectable, where the beam is retractable into the landing body, and where at least one door is closed while the beam projects outward from the landing body.

In accordance with another aspect of the disclosed technique, there is thus provided a point take-off and landing (PTOL) system for an unmanned flying object. The PTOL system includes a suspension cable, a latching element, at least one cable support, a receiving cable, and a cable release/retraction mechanism. The suspension cable is suspended from the flying object. The latching element is coupled with the suspension cable. The cable support projects vertically from a top surface of the landing body such that the flying object can maneuver beyond any obstacles in the vicinity of the landing body. The receiving cable is supported by the cable support. The cable release/retraction mechanism is coupled with the suspension cable or receiving cable, and is operative for releasing and/or retracting the suspension cable or receiving cable. The flying object is guided along at least one flight trajectory, the flying object approaching the landing body such that the latching element latches with the receiving cable, following which the cable release/retraction mechanism releases and/or retracts the receiving cable, hauling the flying object onto a landing surface at the landing body. The cable support may include two cable supports projecting vertically from a top surface of the landing body, where the receiving cable is coupled in between the two cable supports. The two cable supports may be aligned in a parallel configuration, a V-form configuration, or a canted-V form configuration. The cable support may be inclined at an angle to facilitate the latching of the latching element with the receiving cable. A receiving latch may be coupled with the receiving cable, for latching with the latching element. The cable release/retraction mechanism may include at least one winch. The cable release/retraction mechanism may include a first winch situated proximal to the cable support and coupled with the receiving cable, and a second winch situated remotely from the cable support and coupled with the receiving cable, where the first winch and second winch are operative to simultaneously retract the receiving cable to pull the flying object down and forwards while slowing down the flying object. The cable support may be extendable and retractable. The flying object may deploy an aerodynamic lift/drag mechanism to facilitate hovering at a particular height or to facilitate turning around. The retraction of the receiving cable may cause to flying object to turn around with respect to an initial trajectory, such that the flying object is facing an opposite direction from the initial trajectory upon landing. The receiving cable may pull the flying object backwards, without the flying object turning around with respect to an initial trajectory, such that the flying object is facing the same direction as the initial trajectory upon landing. The flying object may approach the landing body in a downwind direction. The flying object may be pulled forward and down onto the landing surface, without the flying object having turned around with respect to an initial trajectory, such that the flying object is facing the same direction as the initial trajectory upon landing. The landing body may be: a land vehicle, a truck, a military vehicle, a High Mobility Multipurpose Wheeled Vehicle (HMMWV), an armored personnel carrier, an aquatic vessel, a boat, a submarine, an aircraft, a moving platform, and/or a stationary platform. The flying object may be: unmanned aerial vehicle (UAV), a piloted aircraft, or a package. The flying object may follow at least one flight trajectory in accordance with a selected landing scenario. The flight trajectory may include: approaching the landing body upwind; flying along a direction that is transverse to the wind direction or to the motion of the landing body; repetitively flying back and forth transverse to the wind direction or to the motion of the landing body; ascending and then gradually descending; repetitively ascending and descending; and/or a flight maneuver that extends the flight duration of the flying object, such that wind drift results in a lag between the flying object and landing body that enables effective hauling down of the flying object onto the landing body by the receiving cable. The selected landing scenario may be based on: parameters at the vicinity of the landing body; parameters of the flying object; parameters of the landing body; and/or current operational characteristics of system components. The PTOL system may include at least one measuring instrument, operative for acquiring at least one of the parameters. The PTOL system may further include a control unit, operative for controlling the flying object and/or landing system components.

In accordance with a further aspect of the disclosed technique, there is thus provided a method for point landing of an unmanned flying object. The method includes the procedures of: acquiring parameters at the vicinity of a landing body, including at least the wind speed and the wind direction thereat; acquiring parameters of the flying object, including at least the speed, direction and altitude thereof; and acquiring parameters of the landing body, including at least the speed, direction and altitude thereof. The method further includes the procedures of: obtaining current operational characteristics of landing system components of the landing body; generating potential landing scenarios in accordance with the acquired parameters and current operational characteristics; and selecting a landing scenario to implement. The method further includes the procedure of executing the selected landing scenario and guiding the flying object along at least one flight trajectory in accordance with the selected landing scenario, by managing the flying object flight controls and selectively activating and maneuvering the landing system components, including: directing the flying object to approach the landing body such that a latching element suspended from the flying object latches onto a receiving cable coupled with the landing body; and releasing and/or retracting the receiving cable with a cable release/retraction mechanism, hauling the flying object onto a landing surface at the landing body. At least one of the procedures may be automated. The flight trajectory may include: approaching the landing body upwind; flying along a direction that is transverse to the wind direction or to the motion of the landing body; repetitively flying back and forth transverse to the wind direction or to the motion of the landing body; ascending and then gradually descending; repetitively ascending and descending; and/or a flight maneuver that extends the flight duration of the flying object, such that wind drift results in a lag between the flying object and landing body that enables effective hauling down of the flying object onto the landing body by the receiving cable. The landing scenario may include a following operation of the flying object: deployment of aerodynamic lift/drag augmentation mechanisms; hovering at a particular altitude; initiating a turn; cutting off engine power; turning around with respect to an initial trajectory, by the retraction of the receiving cable, such that the flying object is facing an opposite direction from the initial trajectory upon landing; being pulled backwards by the receiving cable, without turning around with respect to an initial trajectory, such that the flying object is facing the same direction as the initial trajectory upon landing; and being pulled forward and down onto the landing surface, without the flying object having turned around with respect to an initial trajectory, such that the flying object is facing the same direction as the initial trajectory upon landing. A control unit may control the flying object, the landing body and/or the landing system components.

In accordance with yet another aspect of the disclosed technique, there is thus provided a PTOL system for sequential landing of unmanned flying objects. The PTOL system includes a suspension cable, a latching element, a railway, and a latching mechanism. The suspension cable is suspended from each of the flying objects. The latching element is coupled with the suspension cable. The railway includes a trap segment and a touchdown region. The latching mechanism is operative for engaging with the latching element. One of the flying objects approaches the railway along a landing approach trajectory toward the trap segment, such that the latching element latches with the latching mechanism, which then pulls the suspension cable down and forwards, hauling down the flying object onto the railway within the touchdown region. The flying object may include a global positioning system (GPS), operative for directing the flying object toward the trap segment of the railway. The latching mechanism may include a plurality of clasps rotating sequentially along a moving chain arranged in a track situated underneath the railway. The railway may include a triggering element, operative for triggering the activation of the latching mechanism. The trap segment may include two rail portions of the railway, each of which extends outward laterally in a V-shape. The flying object may be a UAV. The railway may further include a maintenance region, at which the flying object undergoes at least one maintenance or flight preparation operation. The railway may further include a launching region, at which the flying object is launched from. The railway may be mounted onto a landing body, such as: an aquatic vessel, a land vehicle, a stationary platform, and/or a moving platform.

BRIEF DESCRIPTION OF THE DRAWINGS

The disclosed technique will be understood and appreciated more fully from the following detailed description taken in conjunction with the drawings in which:

FIG. 1A is a schematic illustration of a UAV landing system with a UAV approaching a desired landing point, constructed and operative in accordance with an embodiment of the disclosed technique;

FIG. 1B is a schematic illustration of a subsequent stage of the UAV landing system of FIG. 1A, in which the hook latches onto the receiving latch;

FIG. 1C is a schematic illustration of a subsequent stage of the UAV landing system of FIG. 1A, in which the UAV is guided toward the landing surface along a desired landing path;

FIG. 4F is a schematic illustration of the ship of FIG. 4A, illustrating a landed UAV entering the stowage compartment;

FIG. 5A is a perspective view schematic illustration of a UAV landing system mounted on a vehicle, for landing a UAV in proximity to high surrounding obstacles, constructed and operative in accordance with another embodiment of the disclosed technique;

FIG. 5B is a schematic illustration of a subsequent stage of the landing system of FIG. 5A, in which the latching has taken place;

FIG. 5D is a schematic illustration of a subsequent stage of the landing system of FIG. 5A, in which the UAV has come to rest between the cable supports;

FIG. 5E is a schematic illustration of a subsequent stage of the landing system of FIG. 5A, in which the UAV has been lowered onto the landing surface;

DETAILED DESCRIPTION OF THE EMBODIMENTS

Figure 2:
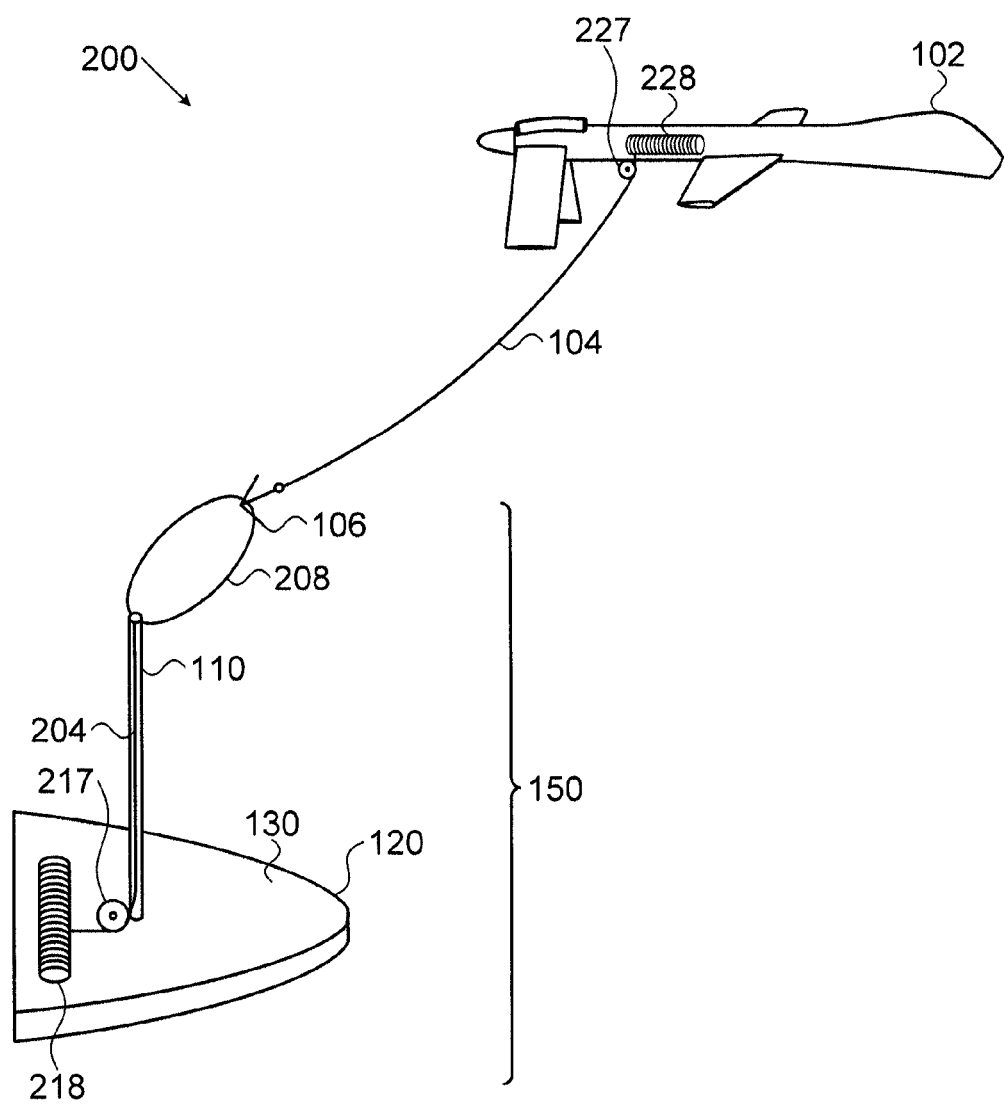
FIG. 2 is a close up schematic illustration of the landing system of FIGS. 1A-1C, illustrating cable release/retraction mechanism components.

The disclosed technique overcomes the disadvantages of the prior art by providing systems and methods for point take-off and landing (PTOL) of an unmanned flying object, such as an unmanned aerial vehicle (UAV), onto/from a confined landing surface, without a runway. The landing surface is associated with a landing body, such as a land vehicle or an aquatic vessel, which may be in motion during the landing or take-off operations. The disclosed technique is especially useful for PTOL of a UAV during strong winds. The disclosed technique is particularly applicable to the landing/take-off of large-wingspan fixed-wing UAVs onto/from a ship.

The term "flying object", and any variations thereof, as used herein, refers to any type of unmanned object or vehicle, capable of controlled flight maneuvering along an aerial trajectory during a take-off or landing, including but not limited to: a UAV, a parachuted parcel, and the like.

The term "latching element", as used herein, refers to any type of element or structure capable of latching onto or otherwise engaging with a receiving latch, including but not limited to: a hook, a clip, a clasp, a fastener, a magnet, and the like.

The term "receiving latch", as used herein, refers to any type of element or structure capable of being latched onto or otherwise engaged by a latching element, including but not limited to; a cable, a cable loop, a magnet, a wire, and the like.

The terms "rod" and "cable support", and any variations thereof, are used herein interchangeably to refer to any type of structure for supporting a receiving cable at a certain location, height, and orientation relative to the landing body, to enable the latching or engagement of the hook with the receiving cable or receiving latch. For example, the rod may be: a post, a pole, a tree, and the like.

The term "cable release/retraction mechanism", and any variations thereof, as used herein, refers to any type of device or mechanism operative for retracting and releasing (e.g., winding and unwinding) the cable at a particular speed, and/or otherwise controlling the tension of a cable, as desired. For example, the cable release/retraction mechanism may be: a winch, such as a mechanical, electric, hydraulic, pneumatic, or manually-operated winch; a griphoist; a ratchet and pawl assembly; and the like. Correspondingly, the terms "retract" and "release", and any variations thereof, as used herein, refer to the operations of winding/reeling in the cable, and unwinding/reeling out the cable, respectively.

Reference is now made to FIG. 1A, which is a schematic illustration of a UAV landing system, generally referenced 100, with a UAV, referenced 102, approaching a desired landing point, constructed and operative in accordance with an embodiment of the disclosed technique. UAV 102 flies overhead and towards a landing surface 130 on a ship 120. UAV landing system 100 generally includes a UAV 102 and a landing component 150. UAV 102 includes a suspension cable 104 and a hook 106. Suspension cable 104 is coupled with hook 106, and is suspended from UAV 102 in preparation for landing. Landing component 150 includes a landing surface 130, a rod 110, and a receiving latch 108. Receiving latch 108 is situated at the end of rod 110, which is mounted onto landing surface 130.

Reference is now made to FIG. 1B, which is a schematic illustration of a subsequent stage of the UAV landing system of FIG. 1A, in which the hook latches onto the receiving latch. As UAV 102 flies above landing component 150, hook 106 latches onto receiving latch 108, such that they are securely engaged with one another. Hook 106 represents an exemplary latching element, while other types of latching elements may be utilized instead.

Reference is now made to FIG. 1C, which is a schematic illustration of a subsequent stage of the UAV landing system of FIG. 1A, in which the UAV is guided toward the landing surface along a desired landing path. Once hook 106 latches onto receiving latch 108, a cable release/retraction mechanism (not shown) is activated, enabling UAV 102 to continue its flight path while being guided towards landing surface 130 along a landing path 132. Landing path 132 is depicted in FIG. 1C as substantially semi-elliptical in shape, however alternative landing path shapes or configurations are also applicable. It is also appreciated that the UAV may follow the same landing path, or similar landing path segments, multiple times, such as by repetitively circling around landing surface 130 before landing. During UAV 102 landing, landing system 100 takes into account the ship's motion and the current wind conditions, and may direct UAV 102 to maneuver a certain way and/or to change aerodynamic parameters, such as by deploying flaps or changing engine power settings, in order to effectively guide UAV 102 onto landing surface 130. It is understood that landing surface 130 may alternatively be on a platform other than a ship, for example: a land vehicle (e.g., a truck, or a military vehicle such as a High Mobility Multipurpose Wheeled Vehicle (HMMWV) or an armored personnel carrier), an alternative aquatic vessel (e.g., a boat or a submarine), another aircraft, a stationary location on the ground, and the like. It is also understood that the disclosed technique is also applicable for landing other types of flying objects (besides a UAV), such as a piloted aircraft, or a package, parcel, or other cargo to be delivered. For example, a small aircraft carrying a parcel approaches a landing surface 130 with a landing component 150 (as shown in FIG. 1A), where the parcel includes a suspension cable with a hook (analogous to suspension cable 104 and hook 106). When the aircraft is within sufficient proximity of landing surface 130, the hook latches onto the receiving latch, such that the parcel detaches from the aircraft and is then guided along a landing path onto landing surface 130 (following the same landing process as described hereinabove for UAV 102).

UAV landing system 100 may further include a tracking and guidance mechanism, a navigation system, a global positioning system, closed-loop cameras, night vision instruments, and other forms of tracking and communication and control systems known in the art, in order to facilitate the landing (or launching) of UAV 102. UAV landing system 100 may be at least partially automated, and/or may be operated by a human operator (e.g., via relevant controllers, interfaces and/or input devices). Components of such tracking/communication/control systems can reside on the landing surface 130 (e.g., on ship 120), on the flying object (e.g., on UAV 102), and/or at a remote or nearby location (e.g., a control station).

Reference is now made to FIG. 2, which is a close up schematic illustration of the landing system 100 of FIGS. 1A-1C, illustrating cable release/retraction mechanism components. The cable release/retraction mechanism of landing system 100 includes a pulley 217 and winch 218 at the landing surface 130, and a pulley 227 and winch 228 at the UAV 102. Landing system 100 further includes a cable 204, which is spooled around winch 218 and threaded around pulley 217 and forms a loop 208. Loop 208 embodies an exemplary receiving latch 108 (FIG. 1A). Suspension cable 104 of UAV 102 is also spooled around winch 228 and threaded around pulley 227. Referring to FIG. 2, UAV 102 approaches landing surface 130 in such a manner as to enable hook 106 to latch into loop 208. It is noted, that hook 106 can generally latch onto a loop 208 more easily as compared to other forms of receiving latches, which may require greater flight accuracy and/or manual intervention to properly position the hook with respect to the receiving latch to ensure that the latching takes place. Cable support 110 may be inclined at a particular angle (e.g., approximately 20° azimuth), and or otherwise configured (e.g., having a particular size and shape), in order to facilitate the latching of hook 106 onto loop 208, by providing a larger tolerance for the UAV approach trajectory that would result in successful latching. Once hook 106 latches onto loop 208, winch 228 is activated to release the required cable length, allowing UAV 102 to continue flying smoothly (e.g., without resulting in an abrupt tug) while now being attached to landing component 150. The latching of loop 208 onto hook 106 triggers at least one winch 218, 228 to release additional cable 204 and 104, respectively, thereby further providing cable slack to enable UAV 102 to continue along its current flight path. Winches 228 and 218 may be controlled by at least one processor, which may be situated at a remote location, on UAV 102, and/or on landing component 150. Gradually, cables 104 and 204 are released at a slower rate such that a gradual pulling force is applied to UAV 102. Eventually winches 218 and 228 begin to retract cables 104 and 204 such that UAV 102 is hauled down onto landing surface 130. Suspension cable 104 and hook 106 may then be fully retracted into UAV 102 (e.g., via winch 218), in order to avoid interfering with system components. After landing, UAV 102 may be secured in place by cable 104, to prevent being inadvertently repositioned or damaged due to strong winds. It is understood that landing system 100 may employ either or both of winches 218 and 228 when retracting or releasing cable 104 and/or cable 204. Pulleys 217 and 227 facilitate smooth retraction and release of cables 104 and 204 via winches 218 and 228. It is understood that a landing system 100 may generally include any number of pulleys and winches in any suitable arrangement or configuration, in order to facilitate the retraction and release of cables 104 and 204 when landing UAV 102. Landing system 100 may also include at least one controller (not shown) for controlling UAV 102 flight operations and/or for controlling the activation/maneuvering of the landing system components (e.g., controlling operation of the cable release/retraction mechanism).

It is appreciated that the landing system of the disclosed technique enables UAV landing to be implemented in adverse weather, such as during strong winds (e.g., 50-70 knots). For example, when landing a UAV in a strong wind, the UAV is initially directed to fly upwind over the landing surface. The UAV continues forward beyond the location of the winch, and the UAV latching element latches onto the receiving latch. The UAV then gradually ascends while decreasing velocity. The UAV may reduce engine power and/or deploy aerial decelerators to assist in decreasing velocity. The UAV drifts backwards (downwind) due to the wind while maintaining a minimum flight speed, and eventually passes back over the landing system location. Subsequently, the UAV can be pulled down and forwards onto the landing surface via retraction of the receiving cable by the winch.

Figure 3:
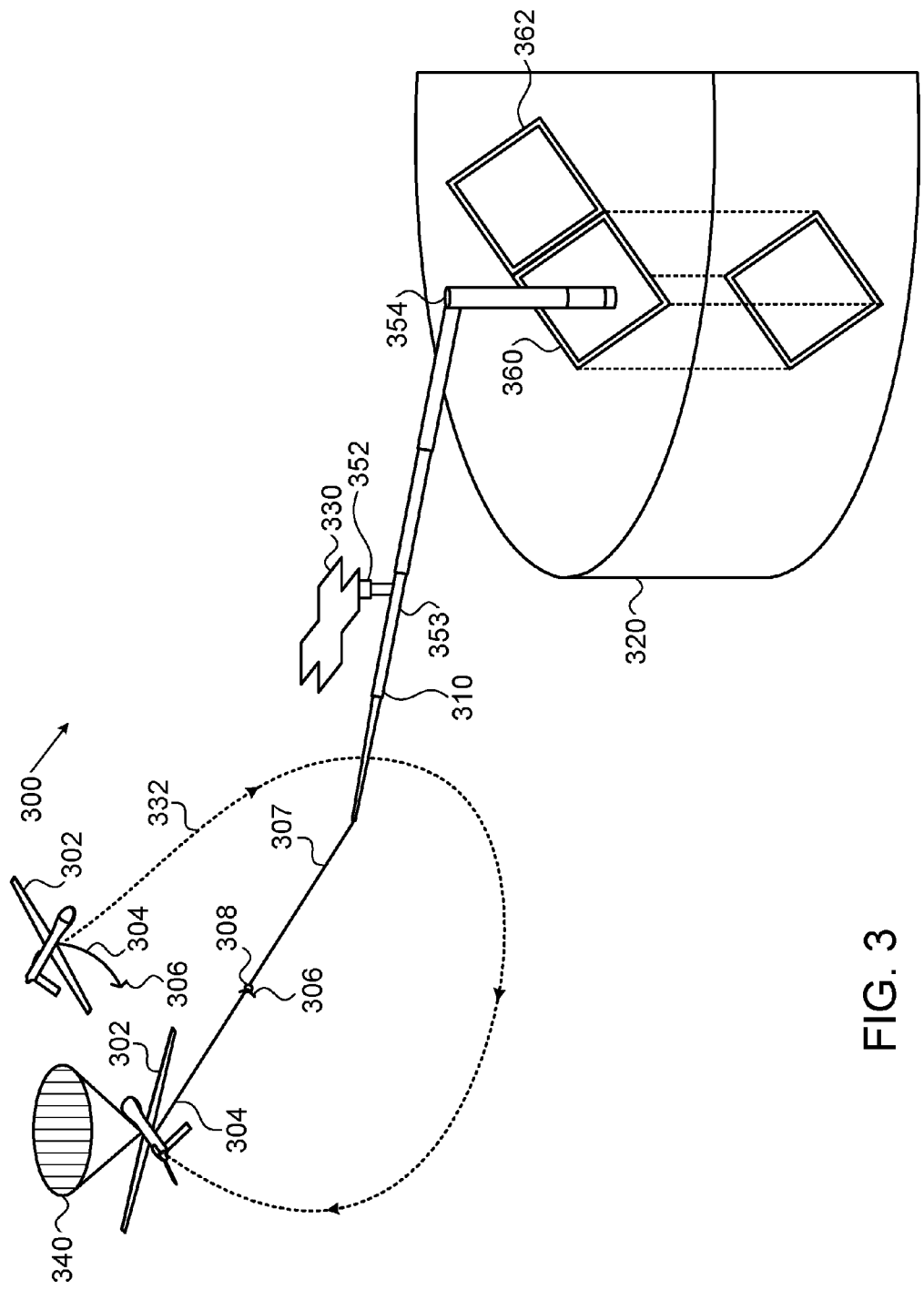
FIG. 3 is a perspective view schematic illustration of a UAV landing system for landing a UAV in an aquatic environment, constructed and operative in accordance with another embodiment of the disclosed technique.

Reference is now made to FIG. 3, which is a perspective view schematic illustration of a UAV landing system, generally referenced 300, for landing a UAV in an aquatic environment, constructed and operative in accordance with another embodiment of the disclosed technique. Landing system 300 includes a UAV 302 with a suspension cable 304 and a hook 306. Landing system 300 further includes a ship 320 that includes a receiving latch 308, a beam 310, a receiving cable 307, a winch (not shown), a landing plate 330 and an elevator 360. Beam 310 is a telescopically extendable and retractable rod or pole which projects outwards substantially horizontally from ship 320 (e.g., being coupled perpendicular to another rod that extends vertically above the deck of ship 320, as shown in FIG. 3). Beam 310 may be pivotable about at least one axis (e.g., azimuth and/or elevation). Landing plate 330 is coupled to beam 310, and may also be pivotable about at least one axis (e.g., azimuth and/or elevation) independent of beam 310. Receiving latch 308 is initially coupled at one end of beam 310. UAV 302 may include a parachute 340 and/or alternative aerodynamic or flight control mechanisms, in order to facilitate maneuvering of UAV 302 (e.g., for lowering the stall speed) in preparation for landing.

UAV 302 may follow a flight path 332 when approaching ship 302, to maneuver properly in preparation for landing. When UAV 302 passes over beam 310 with suspension cable 304 hanging downwards, hook 306 engages with and latches onto receiving latch 308. The latching may be facilitated by the size/shape/orientation of beam 310. For example, beam 310 may be inclined forward at a particular angle (e.g., approximately 20° azimuth), such that suspension cable 304 is guided by the beam 310 to direct hook 306 toward receiving latch 308. In another example, receiving latch 308 may be disposed separately from beam 310, such as being coupled with a second auxiliary beam (not shown) that projects outward from ship 320 adjacent to the main beam 310, while a receiving cable is coupled with receiving latch 208 and an inclined main beam 310, thus facilitating the latching of hook 306 with receiving latch 208 and/or the receiving cable. After the latching takes place, cable 304 may be reeled inside UAV 302 by a UAV winch (not shown), in order to avoid subsequent interference with other components of landing system 300. It is noted that since beam 310 projects outward over the water, the latching between hook 306 and receiving latch 308 occurs above the water, rather than over the body of ship 320, thereby providing sufficient clearance for the wingspan of UAV 302 while avoiding potential equipment damage and potential injury to the occupants of ship 320.

After the latching between hook 306 and receiving latch 308, beam 310 may telescopically retract (e.g., until point 353), in order to guide UAV 302 towards and onto landing plate 330. Landing plate 330 may be pivoted (e.g., horizontally and/or vertically) about pivot point 352, for adjusting landing plate 330 into a suitable position for contact with UAV 302. Beam 310 may also be pivoted horizontally about pivot point 354. Beam 310 may be telescopically extendable and retractable between points 353 and 354, enabling optimal placement of landing plate 330 for collecting UAV 302. Similarly, the vertical rod coupled to beam 310 (i.e., below point 354) may be retractable or extendable, allowing for the optimal placement of landing plate 330 above the water during the collection of UAV 302, and for lowering landing plate 330 together with UAV 302 onto the deck of ship 320. Once UAV 302 is positioned onto landing plate 330, UAV 102 may be secured in place (e.g., using cable 304 and/or other suitable means). Landing plate 330 is sized, shaped and/or configured to enable the collection and subsequent securing of UAV 302 (e.g., with securing latches). Landing plate 330 may include slots or notches to enable passage of cable 304 and/or cable 307. Subsequently, UAV 302 may undergo any necessary operations, such as refueling or repairs, or may be stowed away.

Beam 310 is substantially stabilized (prevented from substantial motion along pitch, roll, or yaw axes), in order to ensure stable latching of UAV 302 and its subsequent positioning onto landing plate 330, despite potentially large amplitude and rapid angular movements (e.g., rolling, heaving, swaying) experienced by ship 320 during its voyage. Beam 310 may also be used for the launching or takeoff of UAV 302 from ship 320, by incorporating suitable launching mechanisms, such as rails, booster bottles, and the like (for example railway 1010 of FIGS. 10A and 10B, discussed hereinbelow).

Elevator 360 may be used to stow the landed UAV 302 within the body of ship 320 (e.g., to provide concealment and/or protection from the environment). Once UAV 302 has touched down onto landing plate 330, landing plate 330 may be maneuvered and positioned above elevator 360. Elevator 360 then descends into the body of ship 320, lowering UAV 302, landing plate 330, and other components of landing system 300, such as beam 310, down into ship 320. After being lowered, UAV 302 may be stowed away at a secure location within ship 320. Elevator door 362 may then be closed, restoring the continuity of the body of ship 320.

Figure 4A:
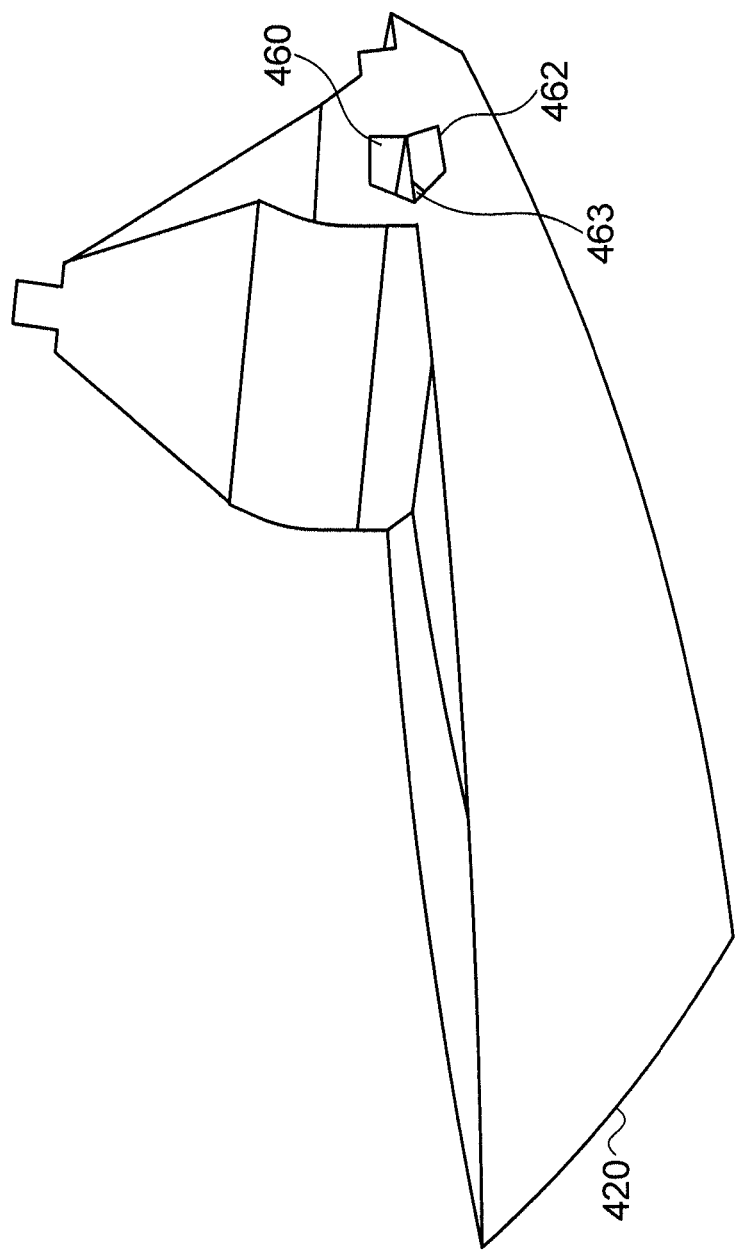
FIG. 4A is a perspective view schematic illustration of a ship with a UAV stowage compartment, constructed and operative in accordance with an embodiment of the disclosed technique.
Figure 4C:
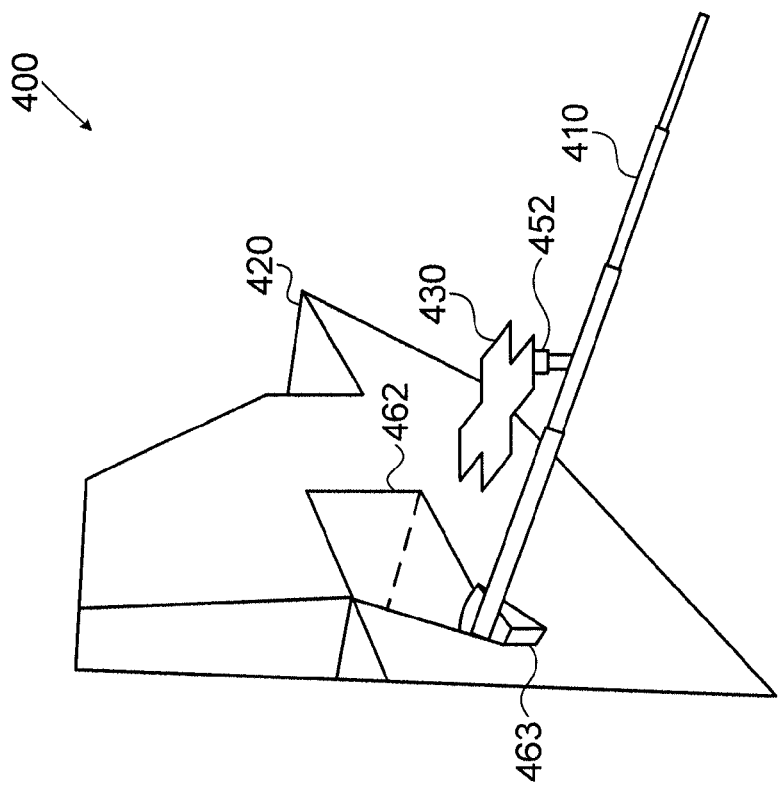
FIG. 4C is a schematic illustration of a subsequent stage of the UAV landing system of FIG. 4B, in which the landing components are deployed.
Figure 4B:
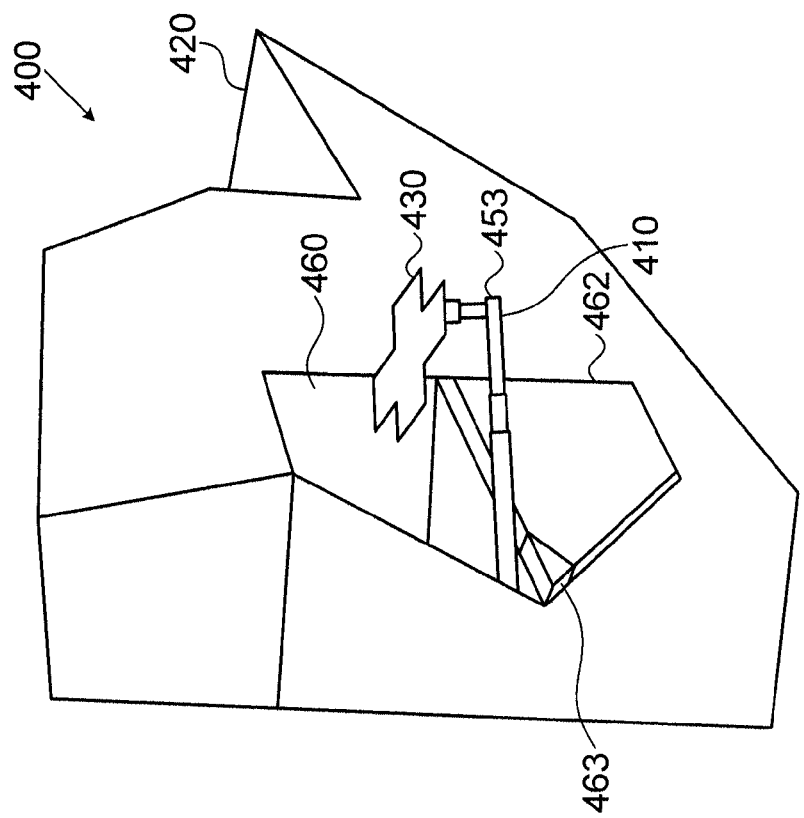
FIG. 4B is a schematic illustration of an initial stage of a UAV landing system for landing a UAV onto the ship of FIG. 4A.

Reference is now made to FIGS. 4A, 4B and 4C. FIG. 4A is a perspective view schematic illustration of a ship with a UAV stowage compartment, constructed and operative in accordance with an embodiment of the disclosed technique. FIG. 4B is a schematic illustration of an initial stage of a UAV landing system, generally referenced 400, for landing a UAV onto the ship of FIG. 4A. FIG. 4C is a schematic illustration of a subsequent stage of the UAV landing system of FIG. 4B, in which the landing components are deployed. Ship 420 includes an interior stowage compartment 460, and a large main side door 462 and a small corner door 463 (seen in FIGS. 4B and 4C) that open into stowage compartment 460. UAV landing system 400 of ship 420 includes a landing plate 430 and beam 410, which are analogous to landing plate 330 and beam 310 of UAV landing system 300 (FIG. 3). Beam 410 projects horizontally outward from the side of ship 420, allowing for landing and subsequent passage of a UAV through side doors 462, 462 and into stowage compartment 460. Such a capability may be particularly useful for ships having a high wall surrounding the ship deck, which would cause difficulties for transporting a UAV onto the ship deck after landing. Ship 420 may be a stealth ship, which attempts to be resistant to radar detection by having an exterior shape and surface that minimizes reflected radar signals, such as being composed of a material that substantially absorbs or reflects radar signals. Thus, it is desirable to maintain the continuity of the exterior surface of ship 420 as often as possible, to minimize susceptibility to radar detection as well as to provide protection from the environment. Accordingly, main door 462 is generally maintained in a closed position.

Referring to FIG. 4B, in preparation for landing UAV 402, doors 462 and 463 are opened, and beam 410 and landing plate 430 begin to emerge from the side of ship 420 (e.g., by pivoting outwards). Referring to FIG. 4C, beam 410 and landing plate 430 are fully deployed with beam 410 projecting outward horizontally from the side of ship 420, allowing for main door 462 to be closed while only corner door 463 remains opened, to substantially restore the exterior continuity of ship 420. It is noted that beam 410 generally extends outward a significant distance away from ship 420, which allows UAV 402 to latch onto beam 410 far away from ship 420, minimizing the risk of damage to ship 420 and UAV 402 and avoiding potential injury to the occupants of ship 420. Beam 410 may be automatically or manually stabilized using a stabilization mechanism, to minimize motion of beam 410 as a result of the movements (e.g., pitch, yaw, roll) of ship 420. Beam 410 may also be raised to ensure that landing plate 430 is maintained at a sufficient height above the water surface.

Figure 4D:
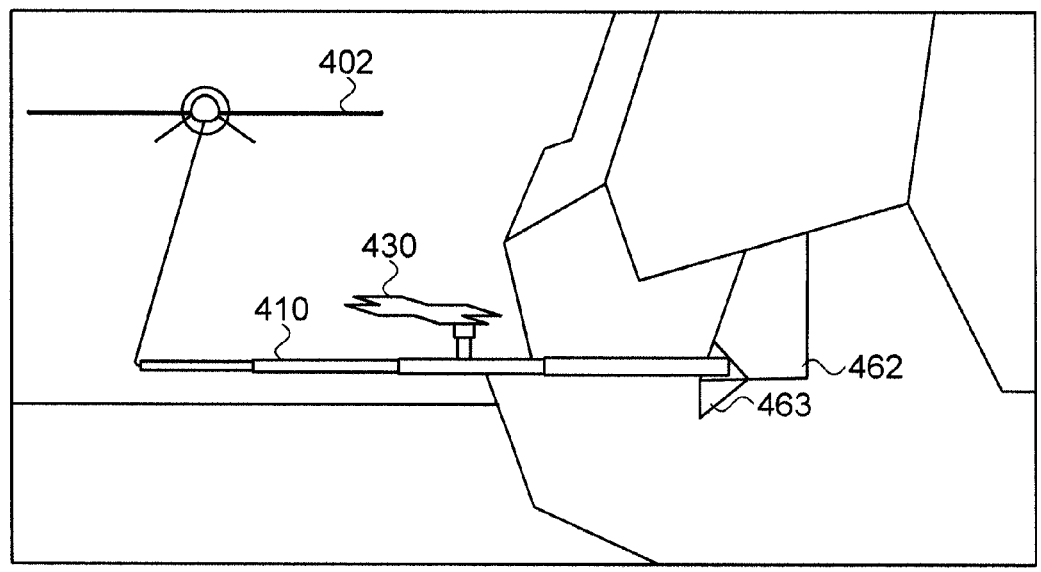
FIG. 4D is a schematic illustration of a subsequent stage of the UAV landing system of FIG. 4B, in which the latching has taken place.
Figure 4E:
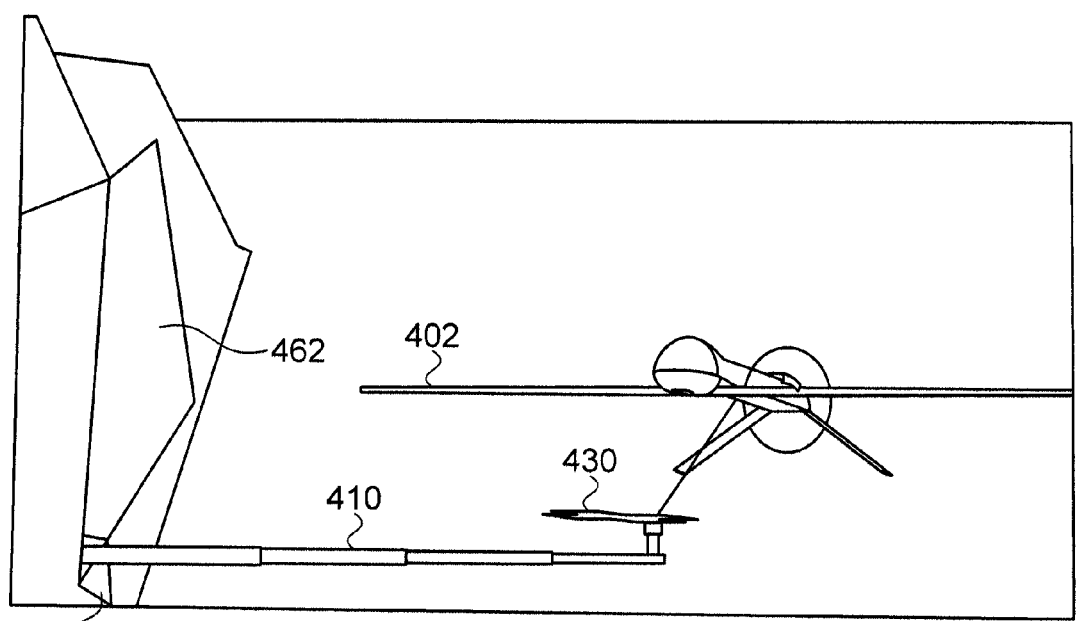
FIG. 4E is a schematic illustration of a subsequent stage of the UAV landing system of FIG. 4B, in which the UAV is guided onto the landing plate.

Reference is now made to FIGS. 4D, 4E and 4F. FIG. 4D is a schematic illustration of a subsequent stage of the UAV landing system of FIG. 4B, in which the latching has taken place. FIG. 4E is a schematic illustration of a subsequent stage of the UAV landing system of FIG. 4B, in which the UAV is guided onto the landing plate, FIG. 4F is a schematic illustration of the ship of FIG. 4A, illustrating a landed UAV entering the stowage compartment. As UAV 402 approaches ship 420 for landing, the latching element (not shown) coupled to UAV 402 engages a receiving latch on beam 410 and latches thereto (FIG. 4D). Beam 410 may be inclined forward at a particular angle, in order to facilitate the latching of the latching element with the receiving latch. Subsequently, UAV 402 is guided onto landing plate 430 (FIG. 4E), and is then conveyed into stowage compartment 460 (FIG. 4F), via suitable retraction and maneuvering of beam 410 and landing plate 430. UAV 402 may be properly adjusted and aligned in order to enable UAV 402 to pass through the opening of door 462 and to fit inside stowage compartment 460. After UAV 402 has entered stowage compartment 460, doors 462 and 463 may be closed to restore continuity to the exterior of ship 420. UAV 402 may be stowed away as soon as possible after landing, to minimize susceptibility of ship 420 to radar detection.

Figure 4G:
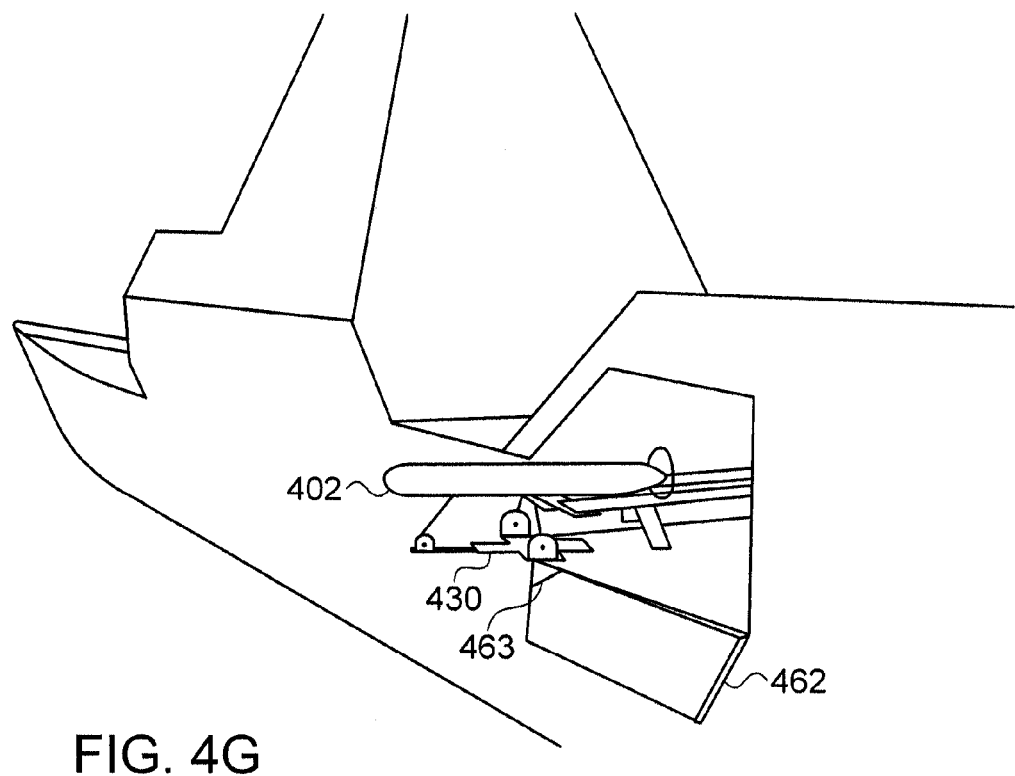
FIG. 4G is a schematic illustration of the ship of FIG. 4A, illustrating a UAV exiting the stowage compartment in preparation for a launch.
Figure 4H:
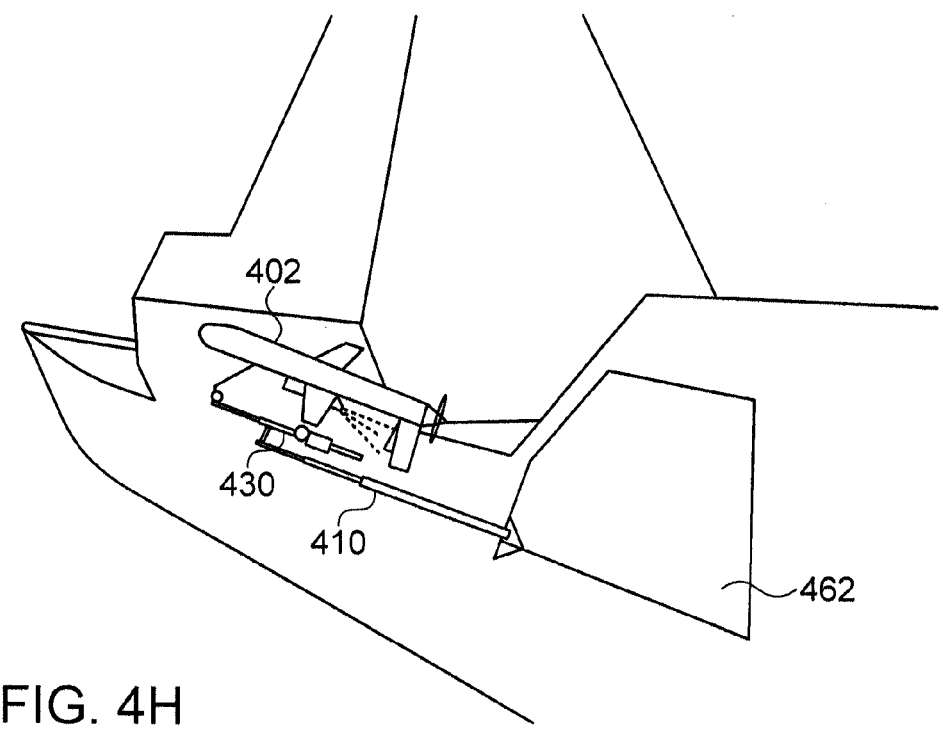
FIG. 4H is a schematic illustration of the ship of FIG. 4A, illustrating a UAV launching.

Reference is now made to FIGS. 4G and 4H. FIG. 4G is a schematic illustration of the ship of FIG. 4A, illustrating a UAV exiting the stowage compartment in preparation for a launch. FIG. 4H is a schematic illustration of the ship of FIG. 4A, illustrating a UAV launching. To enable UAV 402 to exit stowage compartment 460 in preparation for launch (take-off), doors 462 and 463 are opened and then beam 410 is extended, pivoted and maneuvered from within stowage compartment until it projects outwards from the side of ship 420, with UAV 402 positioned on landing plate 430. As soon as UAV 402 has fully exited stowage compartment 460, side door 462 may be closed, leaving only corner door 463 open for beam 410 to pass through. Beam 410 is extended outwards such that landing plate 430 and UAV 402 are positioned above the water surface beyond ship 420. Beam 410 and/or landing plate 430 may also be maneuvered (e.g., rotated) such as to position UAV 402 at a desired elevation angle and a desired azimuth angle (e.g., accounting for current wind conditions) to facilitate its launching. Prior to launch, UAV 402 may start its engine and undergo any requisite pre-flight system checks. Once UAV 402 has launched, side door 462 re-opens (if necessary), beam 410 is retracted and maneuvered back into stowage compartment 460, and then doors 462 and 463 are closed again. It is noted that a different flying object (i.e., other than a UAV) may also be adapted and/or maneuvered as necessary to enable it to be transferred into and out of stowage compartment 460.

Reference is now made to FIG. 5A, which is a perspective view schematic illustration of a UAV landing system, generally referenced 500, mounted on a vehicle, for landing a UAV in proximity to high surrounding obstacles, constructed and operative in accordance with another embodiment of the disclosed technique. UAV landing system 500 generally includes a UAV 502 with a suspension cable 540 and a hook 506, and a vehicle 520 which includes two rods 510A and 510B, a receiving cable 508, pulleys 517A, 517B and 517C, a double-drum winch 518, and a wire bed 530. Vehicle 520 may be any type of land vehicle or mobile platform suitable for carrying the necessary equipment associated with landing system 500, such as for example a truck. Rods 510A and 510B project substantially vertically from vehicle 520, such that the apex of rods 510A, 510B is at least substantially higher than the apex of obstacles, such as trees 560, located in the vicinity of vehicle 520. Rods 510A and 510B are optionally telescopically extendable/retractable and pivotable. Rods 510A and 510B may be anchored to the ground or a nearby fixed structure for support (e.g., via guy-wires). Cable 508 forms a loop between winch 518 and the upper ends of rods 510A and 510B. Cable 508 is threaded around pulleys 517A, 517B and double pulley 517C, enabling the release and retraction of cable 508 along pulleys 517A, 517B and 517C via winch 518. It is understood that FIG. 5A depicts an exemplary cable and pulley configuration, and landing system 500 may include an alternative number of pulleys and/or pulleys that are arranged in an alternative configuration with respect to the receiving cable. UAV 502 is shown approaching vehicle 520 in FIG. 5A, while flying in a downwind direction. It is appreciated that vehicle 520 and the components of UAV landing system 500 are positioned and oriented in accordance with the wind direction, and may be adjusted as necessary if the wind direction changes prior to the UAV landing.

Reference is now made to FIG. 5B, which is a schematic illustration of a subsequent stage of the landing system of FIG. 5A, in which the latching has taken place. As UAV 502 passes over rods 510A and 510B, hook 506 latches onto receiving cable 508. Winch 518 implements controlled cable release/retraction to ensure that UAV continues downwind along its flight trajectory after the latching has occurred.

Figure 5C:
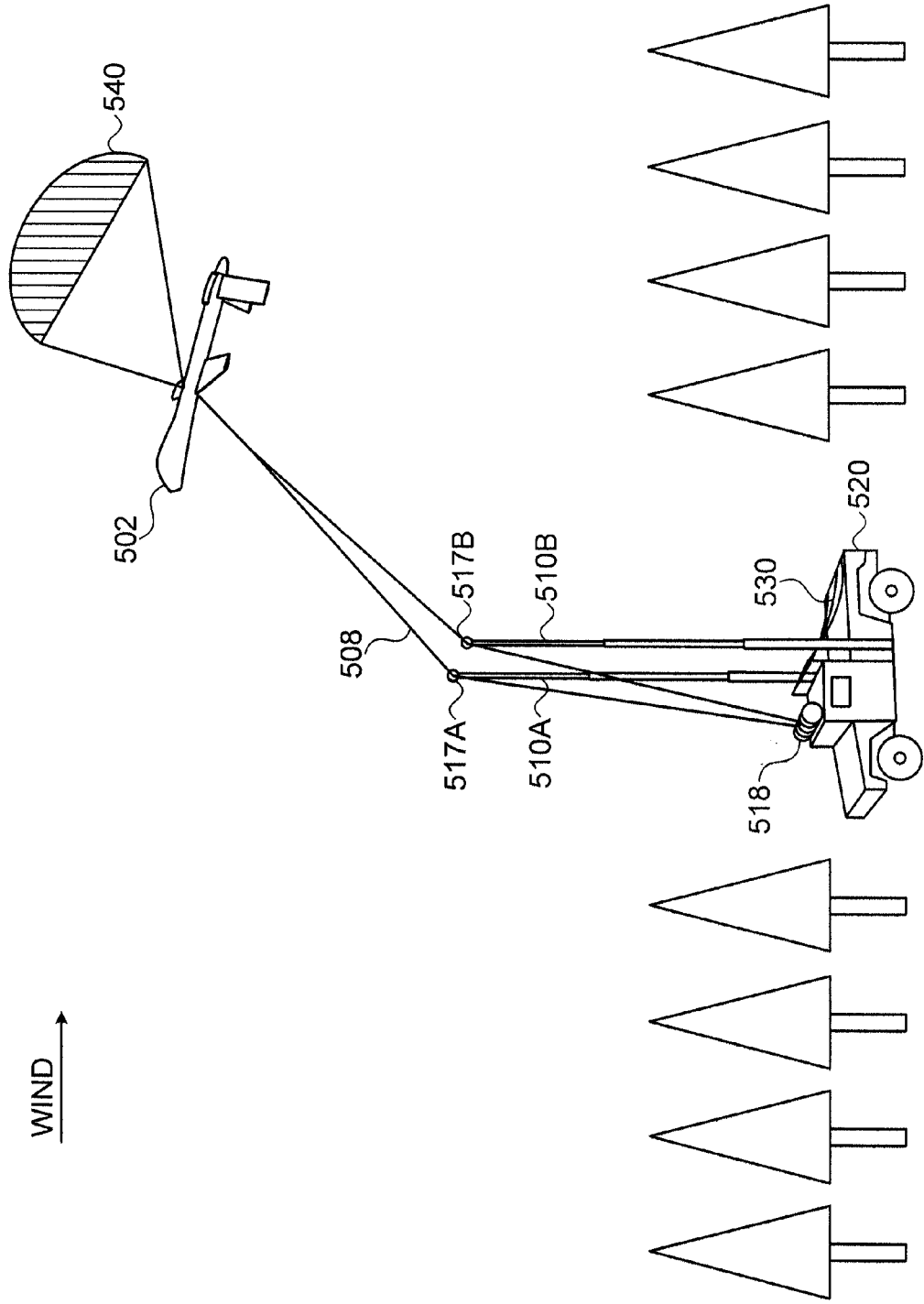
FIG. 5C is a schematic illustration of a subsequent stage of the landing system of FIG. 5A, in which the UAV is being pulled backwards.

Reference is now made to FIG. 5C, which is a schematic illustration of a subsequent stage of the landing system of FIG. 5A, in which the UAV is being pulled backwards. Following the latching of hook 506 onto cable 508 and the release of cable 508 via winch 518 (FIG. 5B), the forward motion of UAV 502 is eventually halted and then UAV 502 is gradually pulled backwards upwind by the retraction of cable 508 via winch 518. A parachute 540 (or other suitable mechanism) is optionally deployed from UAV 502 to facilitate the turning around, as well as to enable UAV 502 to hover at a desired altitude under controlled tension from cable 508. The pulling force applied by retracting cable 508 (optionally with parachute 540) causes UAV 502 to turn around (e.g., executing an approximately 180° turn) so that UAV 502 eventually faces upwind as it is being pulled by cable 508.

Reference is now made to FIG. 5D, which is a schematic illustration of a subsequent stage of the landing system of FIG. 5A, in which the UAV has come to rest between the cable supports. UAV 502 is pulled backwards (upwind) by the retraction of cable 508 until UAV 502 is eventually suspended and comes to rest in between rods 510A and 510B.

Reference is now made to FIG. 5E, which is a schematic illustration of a subsequent stage of the landing system of FIG. 5A, in which the UAV has been lowered onto the landing surface. Once UAV 502 is in a suspended position in between rods 510A, 510B (FIG. 5D), rods 510A and 510B are retracted and, if necessary, cable 508 is slightly released, thereby lowering and positioning UAV 502 onto wire bed 530 located on the top of vehicle 520. The use of wire bed 530 is optional, and UAV 502 may alternatively be positioned directly onto a surface of vehicle 520, or onto an alternative landing platform.

It is appreciated that landing system 500 enables the necessary landing operations for UAV 502 (e.g., latching, halting forward motion, hovering and turning around, hauling in) to take place entirely above any obstacles (e.g., entirely above trees 560), avoiding interference of the UAV landing by the obstacles.

Figure 5F:
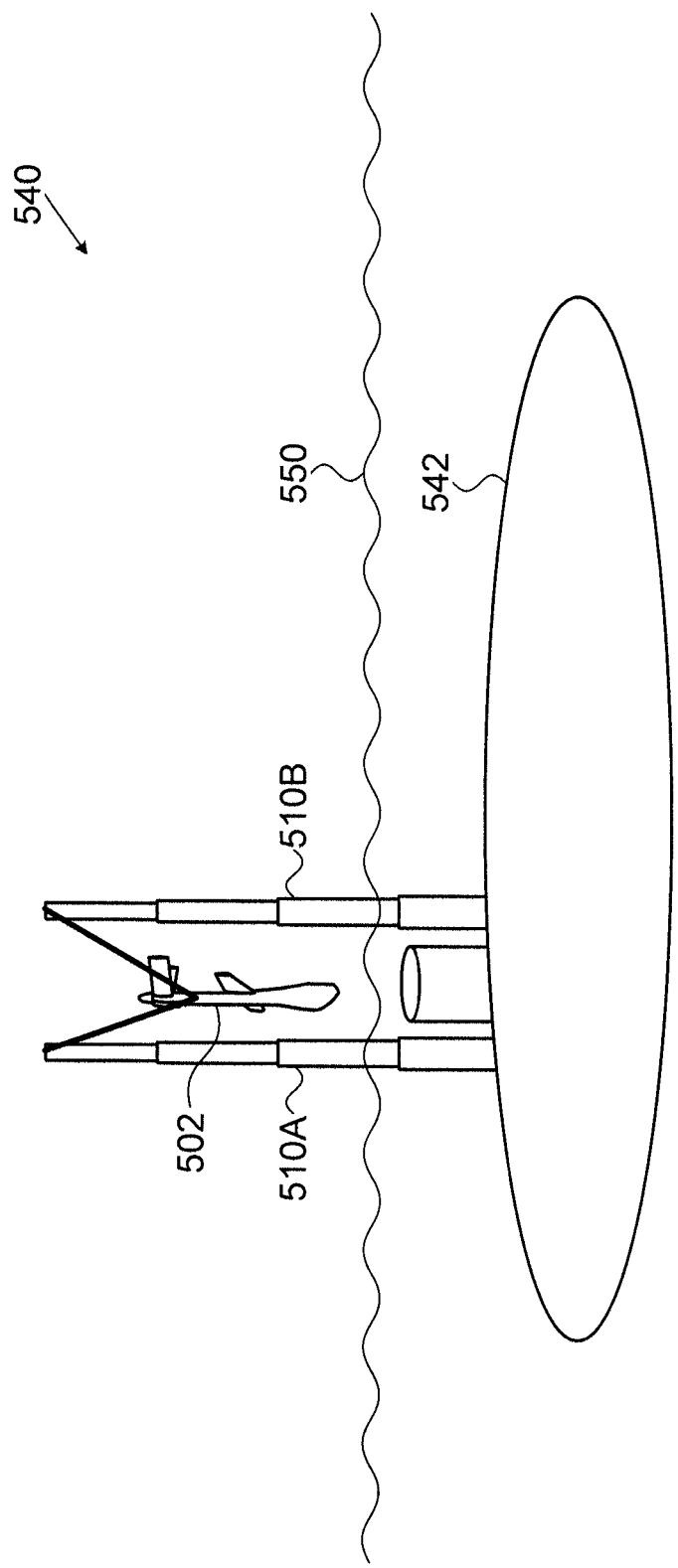
FIG. 5F is a schematic illustration of a UAV landing system mounted on a submarine for landing a UAV in an aquatic environment, constructed and operative in accordance with a further embodiment of the disclosed technique.

Reference is now made to FIG. 5F, which is a schematic illustration of a UAV landing system, generally referenced 540, mounted on a submarine, for landing a UAV in an aquatic environment, constructed and operative in accordance with a further embodiment of the disclosed technique. UAV landing system 540 is generally analogous to landing system 500 (FIGS. 5A-5E), but instead of being mounted onto a land vehicle 520, landing system 540 is mounted onto a submarine 542, to enable point landing of a UAV 502 in an aquatic environment (e.g., a sea or ocean), without the UAV coming into contact with the water, which could result in damage to UAV equipment and components and pose a safety hazard during subsequent flights. Submarine 542 may be partially or fully submerged beneath the water surface 550, while rods 510A and 510B extend upwards from submarine 542 substantially above the water surface 550, to enable the landing operations for UAV 502 (e.g., latching and cable release/retraction operations) to take place entirely above water surface 550. Accordingly, the water surface 550 of the sea or ocean can be considered an obstacle, similar to the trees 560 of FIGS. 5A-5E, from which it is desirable to avoid interference during the UAV landing. After UAV 502 has landed using landing system 540 it may be conveyed into submarine 542. It is understood that while rods 510A and 510B are depicted as being aligned substantially parallel to one another in FIGS. 5A-5F, rods 510A and 510B may alternatively by disposed in an alternative suitable alignment, such as: a V-form, a canted V-form, and the like, that still allows for the implementation of the aforementioned landing process.

Figure 6A:
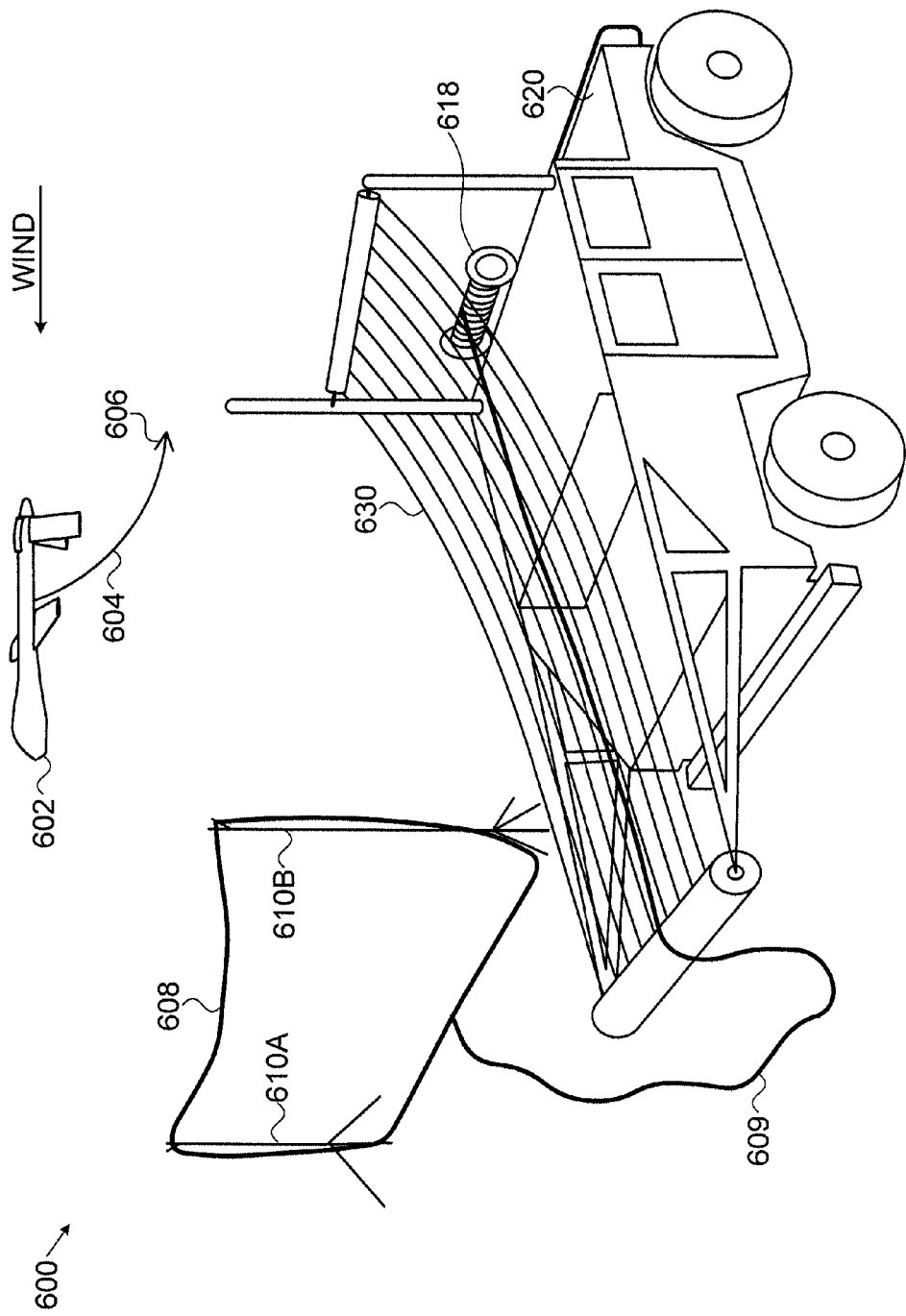
FIG. 6A is a schematic illustration of a UAV landing system for landing a UAV directly onto a land vehicle, in which the UAV is approaching the landing system downwind, constructed and operative in accordance with yet another embodiment of the disclosed technique.

Reference is now made to FIG. 6A, which is a schematic illustration of a UAV landing system, generally referenced 600, for landing a UAV directly onto a land vehicle, in which the UAV is approaching the landing system downwind, constructed and operative in accordance with yet another embodiment of the disclosed technique. UAV landing system 600 generally includes a UAV 602 with a suspension cable 604 and a hook 606, two rods 610A and 610B, a cable loop 608, a cable 609, and a land vehicle 620 which includes a wire bed 630 and a winch 618. Vehicle 620 may be any type of land vehicle suitable for carrying the necessary equipment associated with landing system 600, such as for example a truck. UAV landing system 600 provides point landing of UAV 602 directly onto vehicle 602 (without utilizing a runway and without associated landing preparations). One rod 610A is mounted at a location on the ground beside vehicle 620, while the other rod 610B is mounted on vehicle 620 (alternatively, both rods 610A, 610B may be mounted on the ground). Cable loop 608 extends between rods 610A and 610B, and is coupled with cable 609 which is spooled around winch 618. Rods 610A and 610B may extend sufficiently upward in order to enable the landing operations for UAV 602 (i.e., UAV landing approach; hook trajectory, hook latching, and cable release/retraction) to take place entirely above any obstacles located in the vicinity. The locations of rods 610A and 610B may also be adjusted in accordance with current landing conditions, such as the wind conditions (e.g., the rods may be positioned such that cable loop 608 is substantially perpendicular to the wind direction to facilitate latching).

Figure 6B:
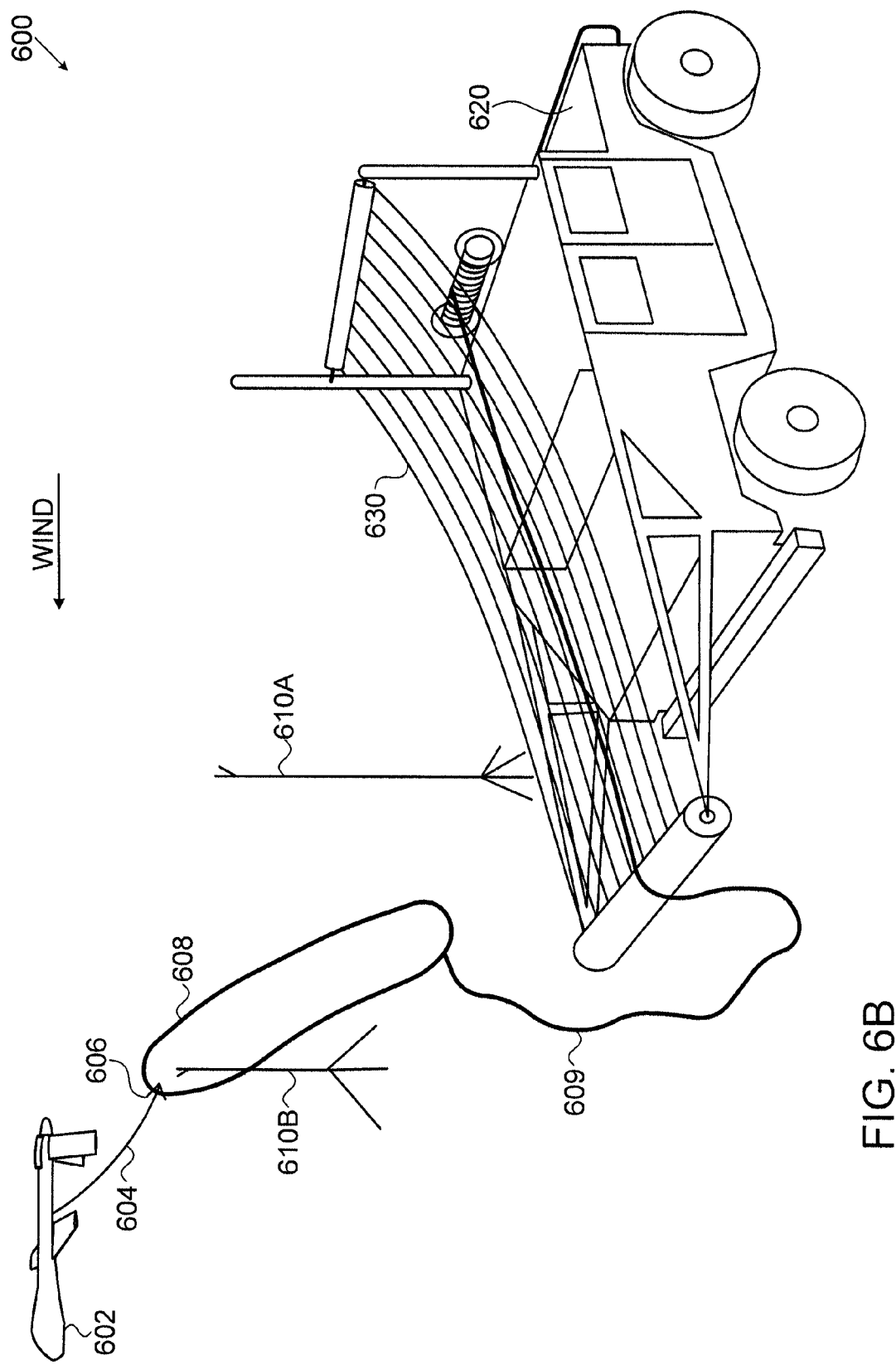
FIG. 6B is a schematic illustration of a subsequent stage of the landing system of FIG. 6A, in which the latching has taken place.

Reference is now made to FIG. 6B, which is a schematic illustration of a subsequent stage of the landing system of FIG. 6A, in which the latching has taken place. As UAV 602 passes downwind over rods 610A and 610B, hook 606 latches onto cable loop 608. Rods 610A, 610B and cable loop 608 may be aligned or configured in such a way as to facilitate the latching with hook 606 (i.e., allowing for larger deviations in the UAV flight trajectory during the latching approach). Since cable loop 608 is situated away from vehicle 620 (rather than directly above vehicle 620), hook 606 will not pass over vehicle during the landing approach, minimizing potential equipment damage and safety risks. After the latching, cable loop 608 undergoes tension and may subsequently detach from rod 610A and/or rod 610B (e.g., cable loop 608 may be coupled with rods 610A, 610B in a manner that results in quick detachment). Winch 618 implements controlled cable release/retraction to allow UAV 602 to continue along its flight trajectory after the latching has occurred. In particular, UAV 602 ascends while progressing downwind.

Figure 6C:
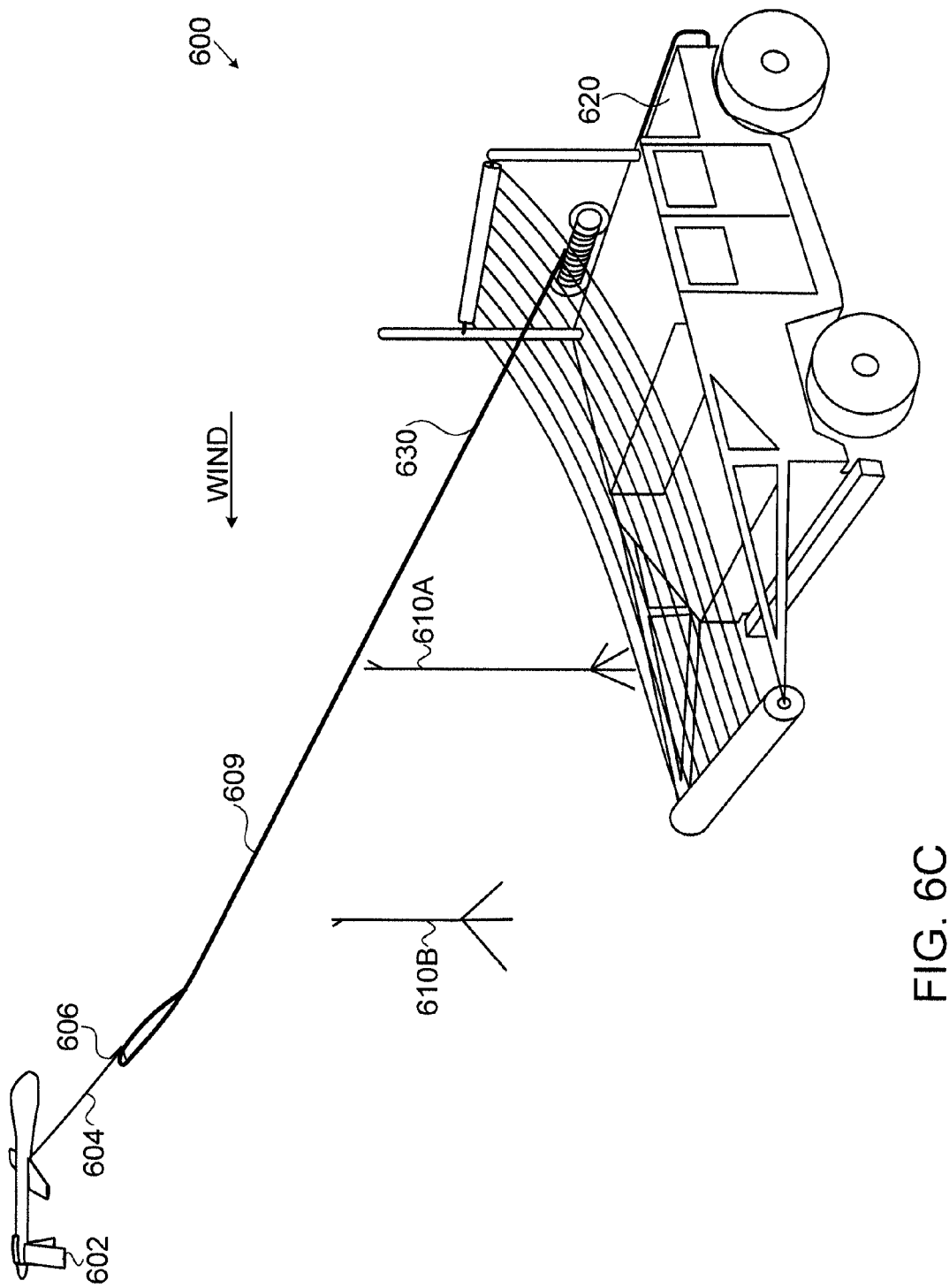
FIG. 6C is a schematic illustration of a subsequent stage of the landing system of FIG. 6A, in which the UAV is being pulled upwind.

Reference is now made to FIG. 6C, which is a schematic illustration of a subsequent stage of the landing system of FIG. 6A, in which the UAV is being pulled upwind. Following the latching and release of cable 609 as UAV 602 ascends and continues downwind (FIG. 6B), winch begins retracting cable 609, gradually pulling UAV 602 backwards (upwind) and causing UAV 609 to turn around from its initial trajectory until it is eventually facing the upwind direction (i.e., executing an approximately 180° turn). While being pulled by cable 609, UAV 602 maintains a minimum flight speed (e.g., at least above the stall speed) and a controlled flight altitude. UAV 602 may optionally deploy aerodynamic lift/drag augmentation mechanisms, such as a parachute, to facilitate the turning around maneuver (due to the natural tendency of the parachute to align with the pulling force axis of the retracting cable), as well as to enable UAV 602 to hover at a desired altitude. It is noted that a parasail canopy is a particularly useful type of parachute for facilitating the turning around of the UAV due to its natural directional alignment with the wind (as opposed to a parafoil type parachute). UAV 602 is gradually lowered onto wire bed 630 by the retraction of cable 609. UAV 602 may alternatively be positioned (i.e., touchdown) directly onto a surface of vehicle 620, or onto an alternative landing platform (i.e., rather than onto wire bed 630). After landing, UAV 602 is optionally secured to vehicle 620 (e.g., using cable 609 and other suitable means), to avoid the UAV 602 inadvertently being repositioned or damaged due to strong winds.

A UAV may alternatively undergo a "tail-first" landing in accordance with the disclosed technique, in which the retracting cable does not cause the UAV to turn around to face the opposite direction from its initial flight trajectory (as depicted in FIG. 6C), but rather the UAV is pulled backwards while still facing the same direction. For example, if the UAV approaches the landing body downwind to execute the landing, then a tail-first landing would involve the UAV being hauled down onto the landing body while the front (i.e., the "nose") of the UAV remains facing downwind. A tail-first landing may result if the UAV does not deploy a parachute at the appropriate time (i.e., around the peak of its ascent, prior to the initiation of the cable retraction,) or if a deployed parachute does not sufficiently assist the UAV to execute a full U-turn. Further alternatively, tail-first landing may result if the parachute is oriented in a manner that would cause the UAV to be pulled backwards by the retracting cable without turning, such as for a parasail, having its slotted lower rear portion oriented toward the front (nose) of the UAV. A head-first landing may be preferable, since the ordinarily thin tail surfaces are typically more delicate when touching down as compared to leading-edge surface that are normally rounded and more rigid. A tail-first landing may be implemented when it is desired to subsequently launch the UAV toward a direction opposite the direction of the initial UAV flight trajectory.

Figure 7:
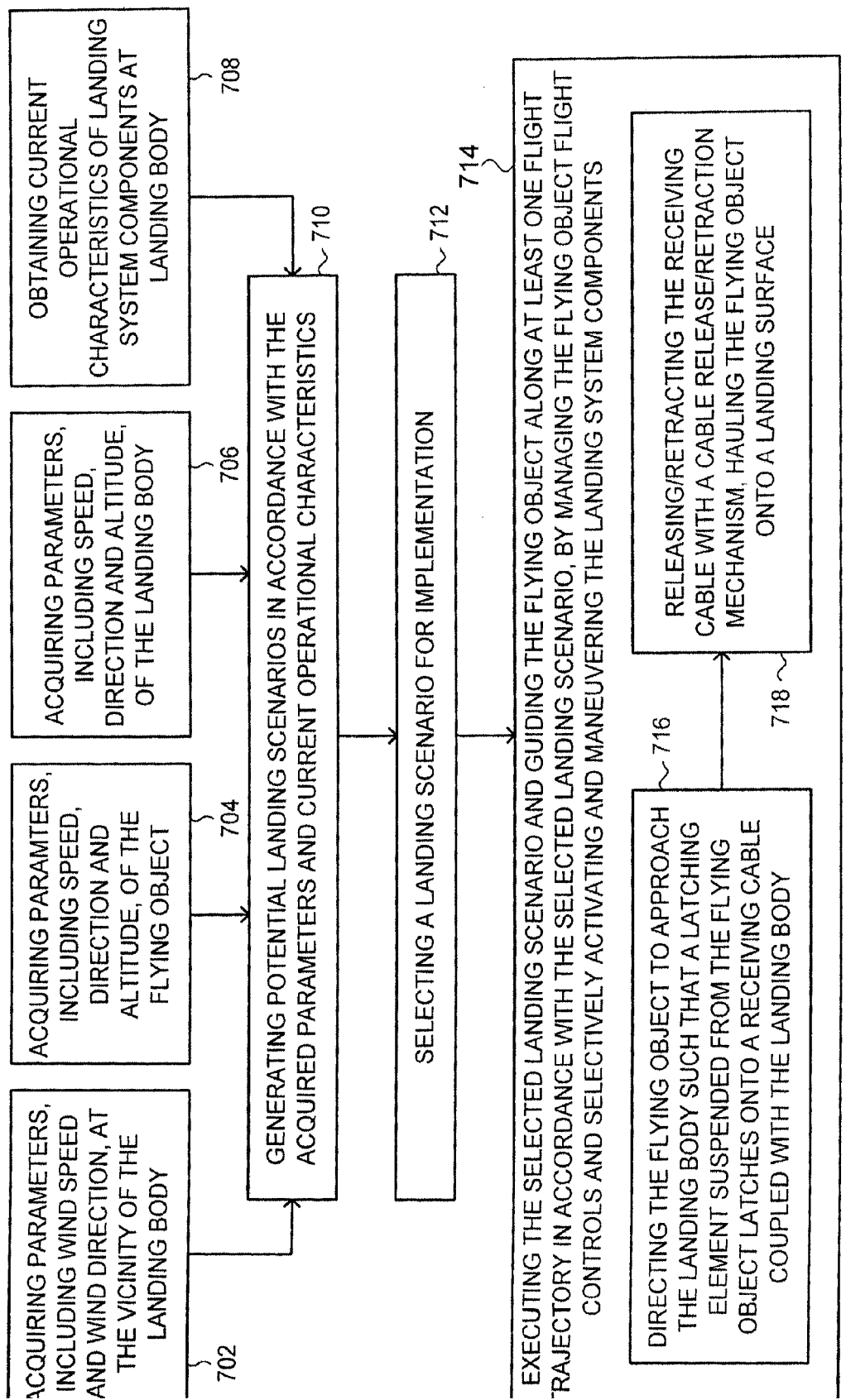
FIG. 7 is a flow diagram of a method for landing a flying object onto a landing surface at a landing body, operative in accordance with an embodiment of the disclosed technique.

Reference is now made to FIG. 7 which is a flow diagram of a method for landing a flying object onto a landing surface at a landing body, operative in accordance with an embodiment of the disclosed technique. In procedure 702, parameters, including the wind speed and the wind direction, at the vicinity of the landing body are acquired. With reference to FIG. 1A, the wind speed, wind direction, and other relevant parameters at the vicinity of the landing body (e.g., ship 120) are acquired prior to the intended landing of a flying object (e.g., UAV 102). Other relevant parameters may include: current weather conditions (e.g., rain, fog); information regarding wind turbulence; information about the landing terrain, including potential obstacles; information about the state of a body of water (e.g., a sea) when landing on an aquatic vessel, such as the height and direction of waves and the speed and direction of water currents; information about the quality of the landing terrain when landing on a land vehicle, such as a paved road or off-road area; and the like. The parameters may be acquired using suitable measuring instruments and detectors located at or on the landing body or in the general vicinity. Alternatively, the parameters may be obtained from external sources via a data network, or may be input manually by a system operator.

In procedure 704, parameters, including the speed, direction and altitude, of the flying object, are acquired. With reference to FIG. 1A, the speed, direction, and altitude of UAV 102 are acquired, along with any other relevant parameters (e.g., its current position relative to landing component 150). The parameters may be acquired using suitable measuring instruments and detectors at UAV 102, or may be input manually by a system operator. Variations in different types of UAVs (e.g., different UAV models) may be accounted for when acquiring the UAV parameters.

In procedure 706, parameters, including the speed, direction and altitude, of the landing body, are acquired. With reference to FIG. 1A, the speed, direction, and altitude of ship 120 are acquired, along with any other relevant parameters. The parameters may be acquired using suitable measuring instruments and detectors at ship 120, or may be input manually by a system operator.

In procedure 708, current operational characteristics of the landing system components at the landing body are acquired. Referring to FIG. 2, the operational characteristics of the various elements of landing component 150 are obtained, such as the characteristics of cable support 110, receiving latch 108, and cable release/retraction mechanism (pulleys 217, 227 and winches 218, 228). The various characteristics may include: position, availability, maximum cable extension length, maximum cable tensile strength, and other suitable parameters.

In procedure 710, potential landing scenarios are generated in accordance with the acquired parameters and current operational characteristics. The extent of all possible landing scenarios is generated, e.g., via a processor and/or other components located at the landing body, taking into account all the acquired parameters (i.e., at the vicinity of the landing body, of the flying object, and of the landing body) and taking into account the operational characteristics of the landing system components. For example, each generated landing scenario may include: a set of landing approach parameters for the flying object, such as: flight speed, direction, and altitude; a set of operating parameters for the landing body, such as: travelling speed and direction; and a set of operating parameters for the activation or manipulation of at least one landing component. A generated landing scenario may also include the application of aerial maneuvers for effective utilization of the wind, the deployment of aerodynamic lift/drag augmentation mechanisms, cutting off the engine of the flying object, and the like. The generated scenarios may be presented to a system operator, along with limitations encountered, advantages and disadvantages, recommendations or other relevant information for each scenario. For example, several potential landing scenarios can be presented to an operator, with one option indicated as being most recommended. The landing scenarios and associated data may be updated in real-time based on changes in the acquired parameters or landing system operating characteristics and/or based on operator input.

In procedure 712, a landing scenario is selected for implementation. One of the previously generated landing scenarios is selected for landing the flying object onto the landing body. The selection of the landing scenario may be performed automatically, such as by a processing unit, based on predefined criteria (e.g., the optimal landing scenario that meets required criteria for current landing conditions), and/or based on operator input. For example, an operator may provide feedback to the automated selection unit to influence the landing scenario selection, or the operator may directly select a preferable landing scenario. The operator may also make adjustments to the selected landing scenario, in advance or in real-time. Intervention by the operator may follow from consultation with suitable personnel, such as the ship command crew, regarding certain operational requirements (e.g., a mandatory sailing course).

In procedure 714, the selected landing scenario is executed and the flying object is guided along at least one flight trajectory in accordance with the selected landing scenario, by managing the flying object flight controls and selectively activating and maneuvering the landing system components. In particular, the flying object is directed to approach the landing body such that a latching element suspended from the flying object latches onto a receiving cable coupled with the landing body (procedure 716), and the receiving cable is released/retracted with a cable release/retraction mechanism, hauling the flying object onto a landing surface (procedure 718). Referring to FIG. 2, UAV 102 is directed to approach ship 120 until hook 106, suspended from UAV 102 via cable 104, latches onto loop 208 on rod 110 mounted on ship 120. Subsequently, winches 218 and/or 228 are activated to initially release and then gradually retract cables 104 and/or 204, affecting the flight paths of UAV 102 and eventually hauling UAV 102 onto landing surface 130 on ship 120. While following the landing scenario, UAV 102 may also be controlled or instructed to fly or operate in a certain manner, such as deploying aerodynamic lift/drag augmentation mechanisms, hovering at a desired altitude, initiating a turn, cutting off the engine power, and the like. For example, the executed landing scenario may include the following stages: UAV approaches landing body; cable latching/engagement; UAV ascent; deploying parachute when reaching maximum altitude (peak of ascent); UAV descending and drifting laterally under the effect of the wind; retracting cable to cease UAV descent; stabilizing UAV behind the landing body (e.g., ship); and finally, hauling the UAV down onto landing surface. Another exemplary landing scenario (as described in FIG. 8A) may include the following stages: UAV approaches ship; cable latching/engagement; UAV turning laterally with respect to the ship while ship sails upwind; UAV flying back-and-forth transverse to the wind/ship direction, generating a lag between the UAV and ship (along the direction of ship motion); and cable retraction to haul down the UAV onto the ship landing surface. A further exemplary landing scenario (as described in FIG. 8B) may include the following steps: UAV approaches ship; cable latching/engagement; UAV ascending along a vertical trajectory while the ship sails upwind; UAV descending gradually while undergoing drift; UAV ascending/descending repeatedly, generating a lag between the UAV and ship (along the direction of ship motion); and cable retraction to haul down the UAV onto the ship landing surface. A further exemplary landing scenario (as described in FIG. 3 and FIGS. 4A-4H) includes UAV landing and subsequent stowage, as well as UAV take-off, via a side-door and elevator of the ship. Further landing scenarios may involve landing during strong wind conditions, and/or "straight-ahead" UAV landing (as described hereinbelow in FIGS. 9, 10A and 10B).

A command and control unit (not shown) may control or provide instructions to the flying object, landing body, and/or landing components. The landing system may include communication systems and mechanisms known in the art (e.g., radio, cellular, satellite, and the like), to communicate with the flying object and/or landing body while implementing the landing scenario. The landing scenario may be altered and adapted in real-time to account for practical considerations and/or changes in current conditions (e.g., changing weather).

It is appreciated that any of the procedures of the method of FIG. 7 may be automated (i.e., executed at least partially using a processor or computer). This provides various advantages as compared with only manual (operator controlled) execution, such as: obtaining data from sensors and landing body equipment and data systems, enabling POTL in a wider variety of environments and conditions; faster operation; the ability to consider a large number of variables and to calculate additional landing scenarios; the ability to prepare landing system components to operate with different types of flying objects (e.g., different UAVs having different characteristics); reduced operator training requirements and workload; and limited potential for human error (e.g., due to inexperience, fatigue, stress, and the like).

Figure 8A:
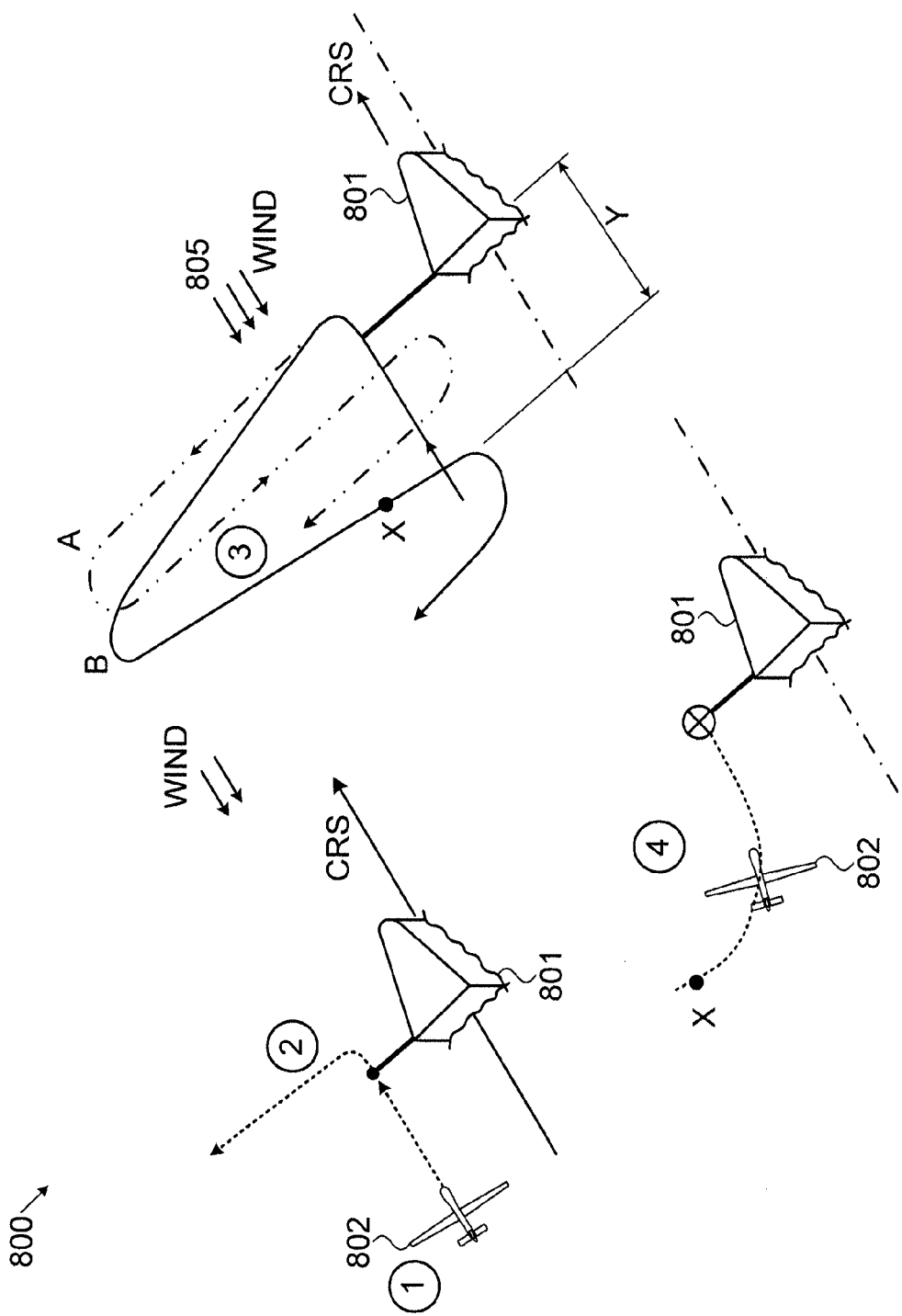
FIG. 8A is a perspective view schematic illustration of an exemplary landing scenario that utilizes the wind to maneuver the UAV, operative in accordance with an embodiment of the disclosed technique.

Reference is now made to FIG. 8A, which is a perspective view schematic illustration of an exemplary landing scenario, generally referenced 800, that utilizes the wind to maneuver the UAV, operative in accordance with an embodiment of the disclosed technique. Landing scenario 800 employs a UAV landing system for landing a UAV 802 onto a ship 801. The UAV landing system includes landing system components, and is generally analogous to UAV landing systems disclosed hereinabove. Landing scenario 800 involves exploiting the current wind conditions for maneuvering UAV 802 with respect to ship 801. Landing scenario 800 is illustrated in four stages that progress sequentially over time. In stage 1, ship 801 sails along a course heading opposite the wind direction (referenced 805), i.e., ship 801 is sailing upwind. Meanwhile, UAV 802 flies upwind toward ship 801 at a speed far greater than the ship sailing speed. In stage 2, UAV 802 engages with the landing system on ship 801, by latching a suspended latching element (e.g., hook) with a receiving cable hanging from at least one rod mounted on ship 801. After the latching, UAV 802 turns (e.g., left) to head in a direction transverse to wind direction 805, and the cable release/retraction mechanism of the landing system on ship 801 is activated to begin release/retraction of the receiving cable. In stage 3, UAV 802 is directed to fly back and forth substantially perpendicular to wind direction 805, i.e., in an S-shaped pattern, in multiple flight legs that are transverse to the motion of ship 801. For example, UAV 802 may be maneuvered to follow trajectory A, first flying outward (i.e., away from ship 801), and then making a U-turn and flying back towards ship 801, and so on. However, due to the drift effect of wind 805, the actual trajectory that UAV 802 follows is represented by trajectory B. While UAV 802 follows the aforementioned S-shaped pattern flight maneuvers, ship 801 continues to sail, and hence there is a resultant lag (referenced "Y" in FIG. 8A) along the direction of ship motion between ship 801 and UAV 802. UAV 802 may repeat multiple cycles of the S-shaped pattern flight maneuvers transverse to the motion of ship 801 while maintaining a normal flight speed (i.e., without slowing down), until a sufficient lag is achieved in order to enable the hauling in of UAV 802 via the cable release/retraction mechanism on ship 801. In stage 4, the cable release/retraction mechanism retracts the receiving cable to haul down UAV 802 onto a landing surface on ship 801. It is noted that landing scenario 800 employs a combination of the motion of ship 801, the wind direction 805, and the operation and maneuvering of UAV 802, to enable the effective guidance of UAV 802 along a flight trajectory for landing onto ship 801, without the use of a parachute or other landing accessories.

Figure 8B:
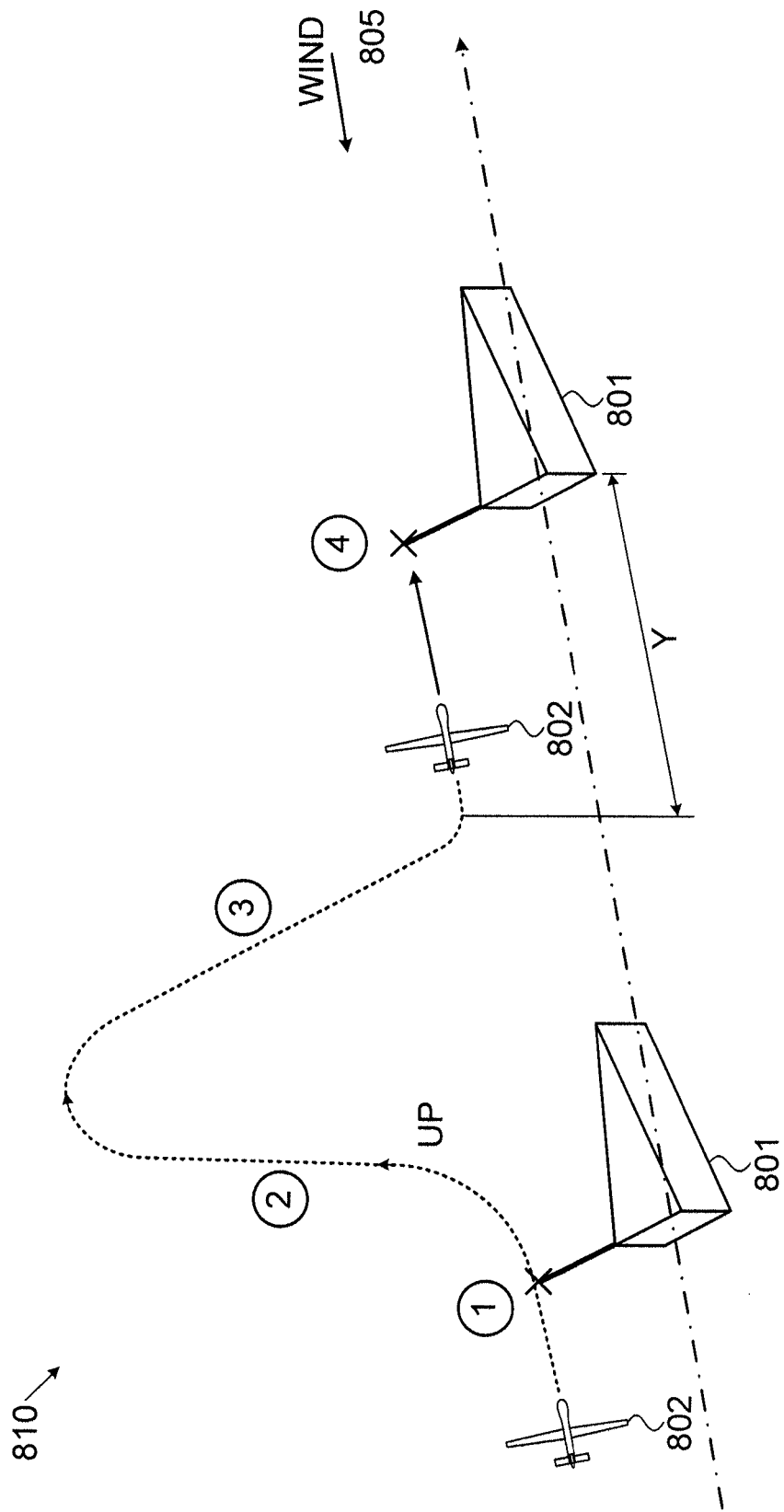
FIG. 8B is a perspective view schematic illustration of another exemplary landing scenario that utilizes the wind to maneuver the UAV, operative in accordance with another embodiment of the disclosed technique.

Reference is now made to FIG. 8B, which is a perspective view schematic illustration of another exemplary landing scenario, generally referenced 810, that utilizes the wind to maneuver the UAV, operative in accordance with another embodiment of the disclosed technique. Landing scenario 810 employs a UAV landing system for landing a UAV 802 onto a ship 801, as with the UAV landing system disclosed in FIG. 8A. Landing scenario 810 also involves exploiting the current wind conditions for maneuvering UAV 802 with respect to ship 801. Landing scenario 800 is illustrated in four stages that progress sequentially over time. In stage 1, UAV 802 approaches ship 801 flying upwind, and engages with the landing system (i.e., latching with the receiving cable). In stage 2, UAV 802 ascends along a vertical trajectory, for a substantial duration, in accordance with the length of the receiving cable coupled with UAV 802 (which may be released further by the winch). The vertical climb naturally slows down the flight speed of UAV 802, while the wind causes UAV 802 to also drift downwind 805. Meanwhile, ship 801 continues along on its course upwind (i.e., heading opposite wind direction 805). In stage 3, UAV 802 descends very gradually (e.g., as slow as possible), while still undergoing drift due to the wind. When UAV 802 reaches a lower altitude, a lag (referenced "Y") results along the direction of ship motion between UAV 802 and ship 801. UAV 802 may repeat multiple cycles of the aforementioned ascent and descent flight maneuver. When the resultant lag is sufficient for enabling the hauling in of UAV 802 via the cable release/retraction mechanism on ship 801, UAV 802 ceases the ascent/descent flight maneuvers. In stage 4, the cable release/retraction mechanism on ship 801 is activated to retract the receiving cable to haul down UAV 802 onto a landing surface on ship 801. It is noted that the ascending and descending of UAV 802 during landing scenario 810 serves to slow down UAV 802, and thus extend its flight duration, so as to increase the wind drift while the forward motion of ship 801 proceeds. The resultant lag enables effective guidance of the UAV 802 onto ship 801 despite the UAV 802 initially overtaking ship 801 after the latching and cable engagement (e.g., if the speed of UAV 802 is greater than that of ship 801 even when factoring in the wind). It is appreciated that landing scenarios 800 and 810 represent exemplary flight maneuvers, and that alternative flight maneuvers may also be employed to utilize the wind for landing the UAV in conjunction with a UAV landing system of the disclosed technique.

Figure 9A:
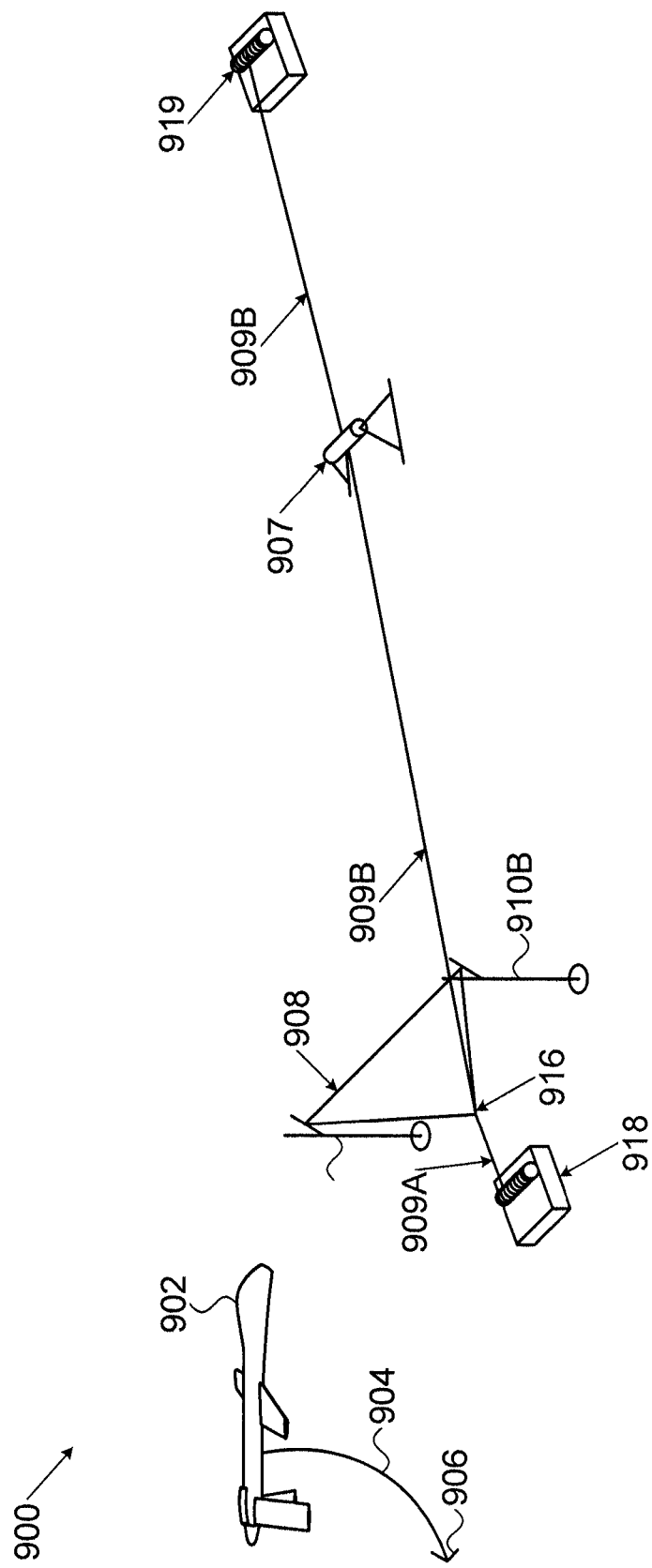
FIG. 9A is a schematic illustration of a UAV landing system for straight-ahead landing of a UAV, constructed and operative in accordance with yet another embodiment of the disclosed technique.
Figure 9B:
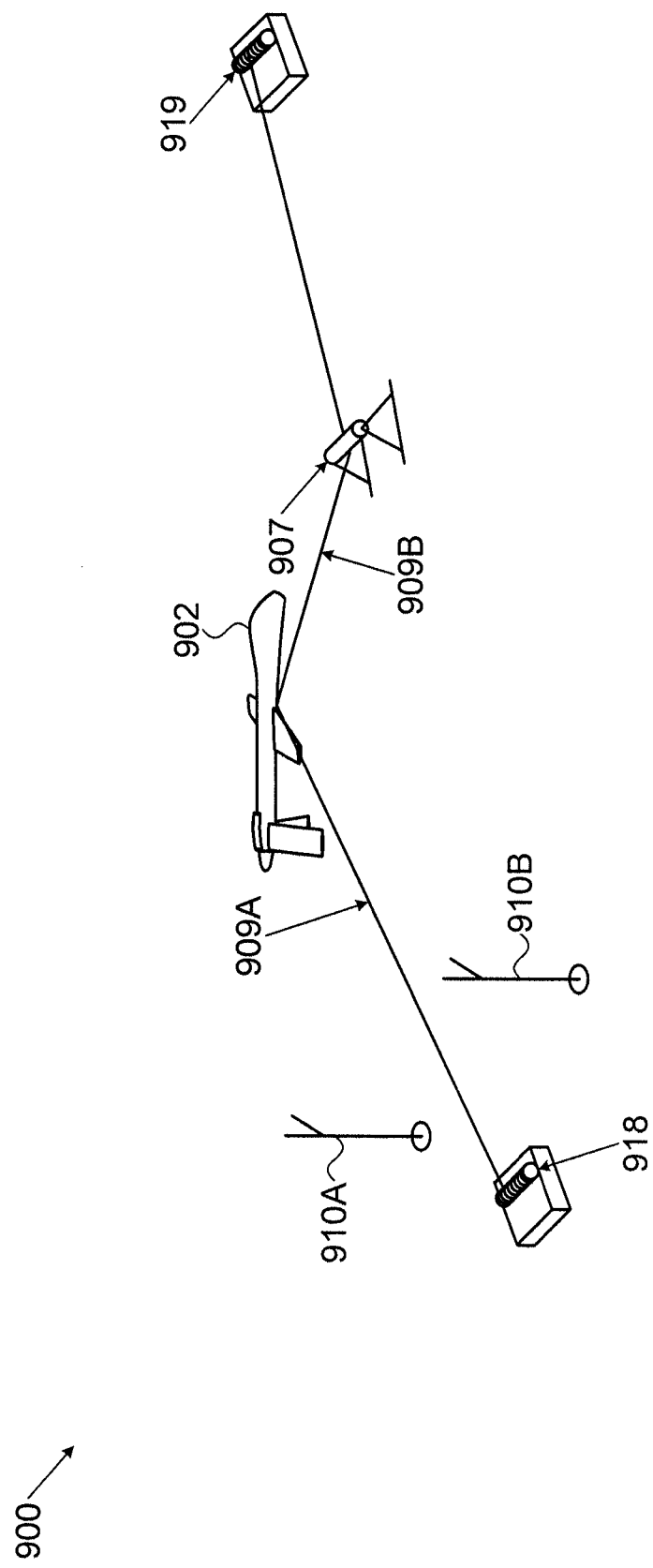
FIG. 9B is a schematic illustration of a subsequent stage of the UAV landing system of FIG. 9A, at which the latching has taken place.
Figure 9C:
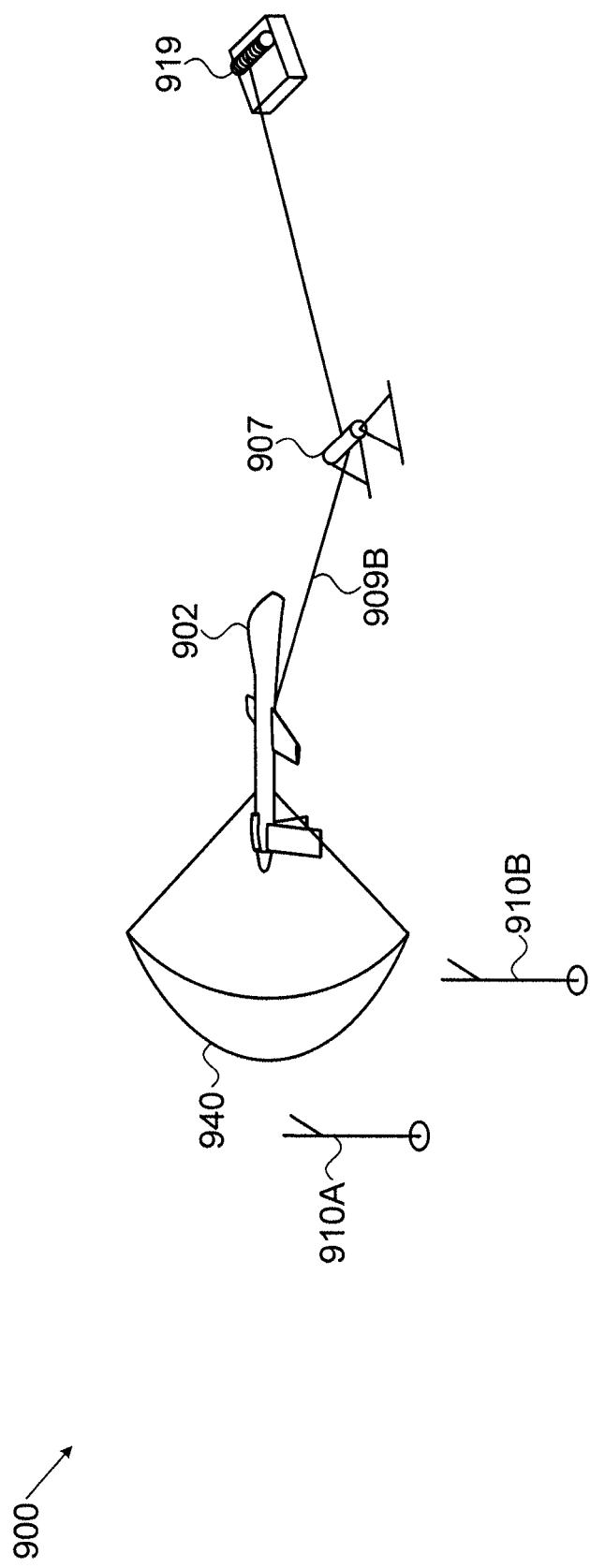
FIG. 9C is a schematic illustration of a subsequent stage of the UAV landing system of FIG. 9A, at which a parachute is deployed to decrease the UAV velocity.

Reference is now made to FIGS. 9A, 9B and 9C. FIG. 9A is a schematic illustration of a UAV landing system, generally referenced 900, for straight-ahead landing of a UAV, constructed and operative in accordance with yet another embodiment of the disclosed technique. FIG. 9B is a schematic illustration of a subsequent stage of the UAV landing system 900 of FIG. 9A, at which the latching has taken place. FIG. 9C is a schematic illustration of a subsequent stage of the UAV landing system 900 of FIG. 9A, at which a parachute is deployed to decrease the UAV velocity. Landing system 900 is operative for landing a UAV, referenced 902, which includes a suspension cable 904 with a hook 906. Landing system 900 includes a proximal winch 918, a remote winch 919, a receiving cable having two portions 909A and 909B, a pulley 907, a cable loop 908, and a pair of rods 910A and 910B. It is noted that pulley 907, winch 918, and cable portion 909A are optional. Cable portion 909B is coupled with winch 919 and with pulley 907. Cable portion 909A is coupled with winch 918. Cable loop 908 is coupled with cable portions 909A and 909B at connection point 916. Cable loop 908 is supported by rods 910A and 910B in a manner such that hook 906 of UAV 902 can successfully latch onto and engage with cable loop 908. Upon latching of hook 906 with cable loop 908, the resultant tension at receiving cable portions 909A and 909B triggers remote winch 919, which begins retracting receiving cable 909B (i.e., at a rate that is faster than the current flight speed of UAV 902) and gradually hauling down UAV 902. Pulley 907 guides the receiving cable portion 909B as it is being retracted by winch 919, and enforces the landing of UAV 902 onto a touchdown point located prior to remote winch 919. The touchdown point may be at a landing surface, which may include a dedicated cushioning platform (e.g., a wire mesh bed). After hook 906 has latched onto cable loop 908 (FIG. 9B), UAV 902 undergoes a rapid decrease of velocity such that cable 909 has sufficient tension to properly guide UAV 902. This velocity decrease may be achieved by a parachute deployed by UAV 902 (as shown in FIG. 9C) or the use of other types of flight decelerators (e.g., spoilers, a retro rocket), by cutting of the engine of UAV 902, by activating breaks of landing gears upon touchdown, and/or via winch 918 creating additional tension on receiving cable portion 909A in coordination with winch 919 creating tension on receiving cable portion 909B so as to pull UAV 902 down and forwards. It is noted that the pulling force of winch 919 is generally much greater than that of winch 918. UAV 902 may be directed to deploy the parachute at an appropriate time (e.g., upon latching of hook 906 with cable loop 908), to provide sufficient velocity decrease of UAV 902 to enable effective retraction of receiving cable 909 by winch 919 and subsequent UAV 902 landing.

FIGS. 9A, 9B and 9C depict a "straight-ahead" landing of UAV 902, in which UAV 902 is landed while constantly facing forward with respect to its landing flight trajectory (i.e., heading along the same direction as the flight trajectory employed during the landing approach), without turning around to face the opposite direction (similar to the "tail-first landing" discussed hereinabove), and while being pulled forward and down (as opposed to being pulled backwards and down, as with the "tail-first" landing). In general, UAV landing system 900 provides a straight-ahead landing by primarily activating remote winch 919 sufficiently quickly in order to retract the receiving cable portion 909B and haul down UAV 902 onto the landing surface, while UAV 902 is simultaneously decelerated (e.g., via parachute 940). Straight-ahead landing may be preferred for heavier UAVs, or when other considerations dictate continuous forward motion during the UAV landing (as with landing system 1000 described hereinbelow).

Figure 10A:
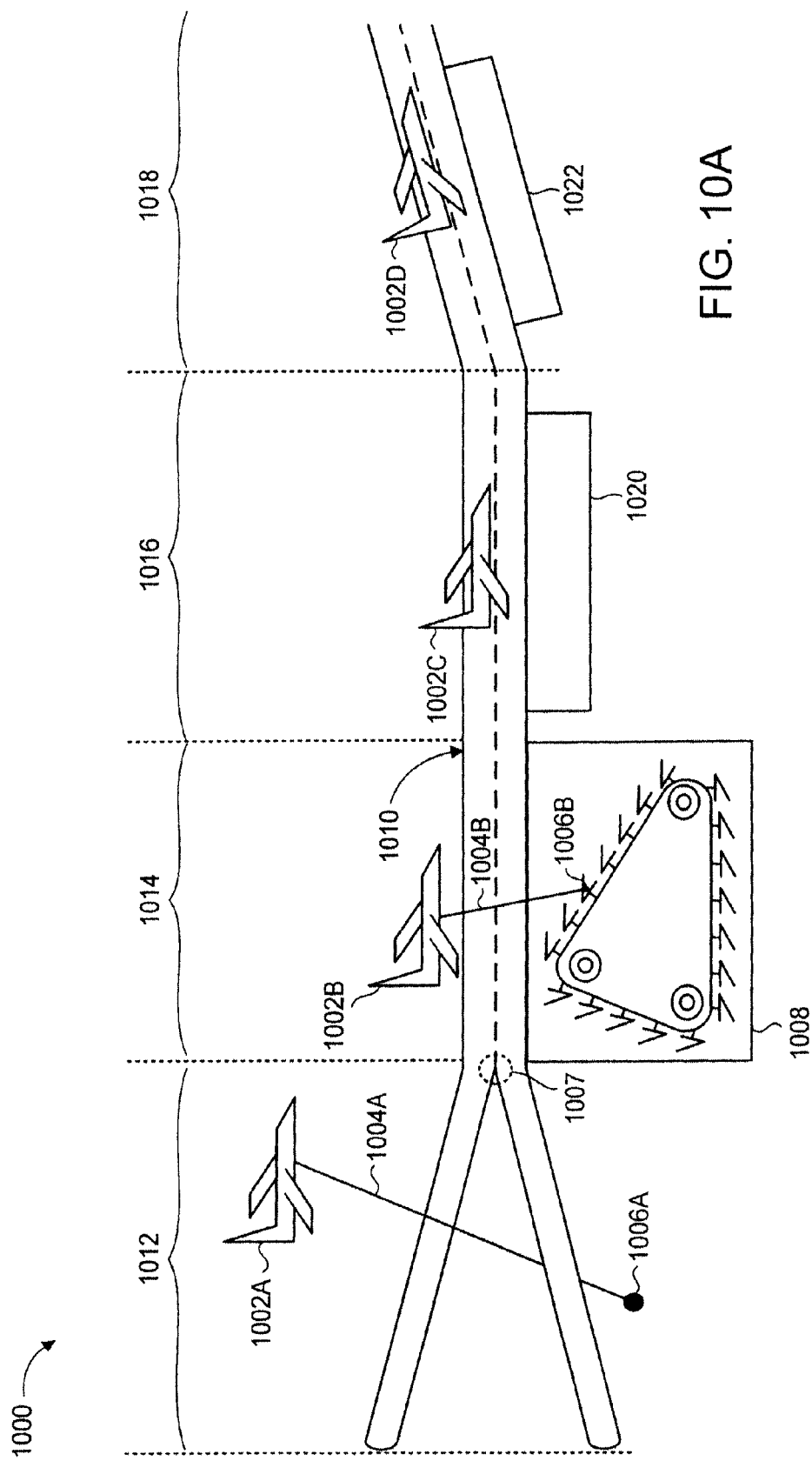
FIG. 10A is a schematic illustration of a landing system for sequentially landing multiple unmanned flying objects, constructed and operative in accordance with yet a further embodiment of the disclosed technique.

Reference is now made to FIG. 10A which is a schematic illustration of a landing system, generally referenced 1000, for sequentially landing multiple unmanned flying objects, constructed and operative in accordance with yet a further embodiment of the disclosed technique. Landing system 1000 includes a railway, generally referenced 1010, which includes a trap segment 1012, a touchdown region 1014, a maintenance region 1016, and a launching region 1018. Railway 1010 may be mounted onto an aquatic vessel in motion (e.g., a sailing ship), a land vehicle in motion, or onto a stationary platform (e.g., at land, at sea, or airborne). Landing system 1000 further includes a latching mechanism 1008 located at touchdown region 1014, maintenance mechanisms 1020 located at maintenance region 1016, and launching assistance mechanisms 1022 located at launching region 1018. Landing system 1000 is operative for landing unmanned flying objects, such as UAVs 1002. Each UAV 1002 includes a suspension cable 1004 with a latching element 1006 (e.g., a hook). UAV 1002 approaches railway 1010 along a landing approach trajectory towards trap segment 1012. Trap segment 1012 may be embodied by two separate rails of railway 1010, each of which extends outward laterally in a V-shape, defining an angle therebetween, as depicted in FIG. 10A, although trap segment 1012 may alternatively be configured in a different manner. UAV 1002 and/or landing system 1000 may optionally include a global positioning system (GPS) or other type of navigational system that is used to direct UAV 1002 toward trap segment 1012 of railway 1010. Alternatively, UAV 1002 navigation may be remotely controlled at a command/control station.

Referring to FIG. 10A, a UAV 1002A to be landed onto railway 1010 approaches trap segment 1012. UAV 1002A is guided along a landing approach trajectory such that suspension cable 1004A and latching element 1006A are positioned in between the two lateral V-shaped portions of railway 1010 forming trap segment 1012. UAV 1002A continues forward past the intersection between the two lateral V-shaped portions (i.e., intersection point 1007), and continuing along a gap extending through railway 1010 (depicted by a dashed line in FIG. 10A). Latching element 1006A subsequently engages with latching mechanism 1008, coupling UAV 1002A with latching mechanism 1008 via cable 1004A. It is noted that the V-shape of trapping segment 1012 assists in guiding suspension cable 1004A and latching element 1006A toward latching mechanism 1008 to enable successful latching. It is further noted that while the main section of railway 1010 generally includes two rails separated by a gap, to allow suspension cable 1004 of UAV 1002 to pass through while being pulled along by latching mechanism 1008, alternative configurations (e.g., a single main rail) are also applicable provided that UAV can be hauled down onto railway 1010 via latching mechanism 1008 in a similar manner.

Figure 10B:
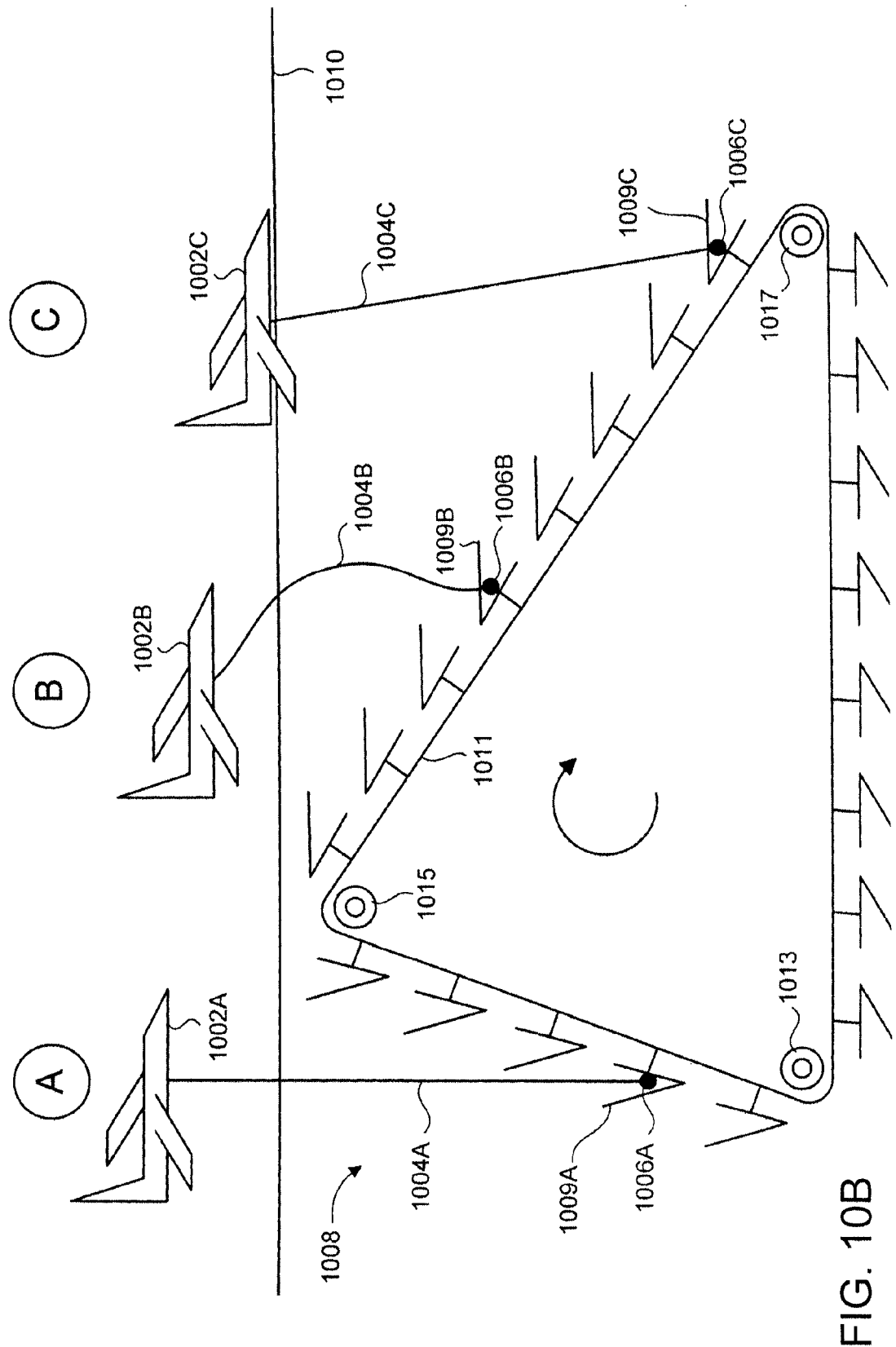
FIG. 10B is a detailed view schematic illustration depicting different stages of touchdown in conjunction with the latching mechanism of the landing system of FIG. 10A.

Reference is now made to FIG. 10B, which is a detailed view schematic illustration depicting different stages of touchdown in conjunction with the latching mechanism 1008 of the landing system 1000 of FIG. 10A. Latching mechanism 1008 includes a plurality of clasps 1009, which rotate sequentially along a moving chain 1011 arranged in a triangular-shaped track situated underneath railway 1010 at touchdown region 1014. A plurality of caster wheels (referenced 1013, 1015, 1017) enable the continuous rotation of chain 1011 along the track. It is appreciated that latching mechanism 1008 represents an exemplary mechanism configuration, while alternative latching mechanisms are also applicable in accordance with the disclosed technique. Railway 1010 may include a triggering element (not shown), such as a switch, disposed adjacent to intersection point 1007, which triggers the activation (high-speed rotation) of latching mechanism 1008. The linear velocity of the rotating chain 1011 of latching mechanism 1008 is greater than the velocity of the UAV 1002 during its landing trajectory. As a result of the higher speed rotation of chain 1011, cable 1004 serves to guide UAV 1002 down onto railway 1010, until UAV 1002 comes to a complete stop within touchdown region 1014.

A UAV 1002A is shown in an initial touchdown stage (designated "A"), where latching element 1002A of UAV 1002A has just latched with one of the clasps 1009A located at the inclining portion of chain 1011 (i.e., in between wheels 1013 and 1015) as UAV 1002 reaches the beginning of latching mechanism 1008 (i.e., just beyond intersection point 1007). UAV 1002 may optionally undergo deceleration at this stage, such as by activating aerodynamic braking mechanisms (e.g., rudder splitting, deploying a drag parachute, activating railway friction, and the like) upon command. After latching onto clasp 1009A, latching element 1006A is carried upward by the rotation of chain 1011 toward wheel 1015. A UAV 1002 is shown at a later touchdown stage (designated "B"), at which the latching element 1006B of UAV 1002B was previously latched within clasp 1009B, which is now located at the declining portion of chain 1011 (i.e., in between wheels 1015 and 1017), and the rotation of chain 1011 is pulling cable 1004B down and forward (toward wheel 1017), thereby hauling down UAV 1002B onto railway 1010. A UAV 1002C is shown at yet a later touchdown stage (designated "C"), at which the latching element 1006C of UAV 1002C was previously latched within clasp 1009C, which is now located further along the declining portion of chain 1011 (i.e., in between wheels 1015 and 1017), where the rotation of chain 1011 has pulled cable 1004C sufficiently down and forward such that UAV 10020 has now completed touchdown onto railway 1010. After the landed UAV 1002 has come to a complete stop, the latching element 1006 may detach from clasp 1009. UAV 1002 may then be taken further along railway 1010 toward maintenance region 1016 and/or launching region 1018.

Following the landing of a UAV 1002 onto railway 1010 as described hereinabove, another UAV may follow and land onto railway 1010 in a similar manner. For example, referring back to FIG. 10A, a first UAV 1002D (i.e., in a sequence of multiple UAVs having arrived at landing system 1000) is shown at launching region 1018 preparing for take-off; a second UAV 1002C is shown at maintenance region 1016 after having completed touchdown; a third UAV 1002B is shown during the latching and touchdown stage over touchdown region 1014; while a fourth UAV 1002A is shown along a landing approach trajectory above trap segment 1012.

UAV 1002 may undergo maintenance operations and/or general preparations for an upcoming flight (e.g., servicing, inspection, refueling, rocket booster mounting, and the like) at maintenance region 1016, with use of maintenance mechanisms 1020. UAV 1002 may be stowed away elsewhere on the landing body (e.g., if deemed unserviceable, or if not scheduled for imminent take-off). Following the necessary maintenance/preparations, the UAV 1002 may be brought along runway 1010 toward launching region 1018, where it may then be launched from railway 1010. It is appreciated that the landing of a UAV onto landing system 1000 takes place relatively quickly (i.e., latching mechanism 1008 provides deceleration and touchdown of a UAV 1002 over a relatively short distance along railway 1010), and thus landing system 1000 facilitates the sequential landing of multiple UAVs over a substantially short period of time. It is further appreciated that landing system 1000 essentially implements a straight-ahead UAV landing, similar to landing system 900 described hereinabove (FIGS. 9A, 9B and 9C), where the landing UAV 1002 is pulled forward and down onto the landing surface while continuing to face the same direction (i.e., without turning).

It will be appreciated by persons skilled in the art that the technique is not limited to what has been particularly shown and described herein above.

The invention claimed is:

1. A point take-off and landing (PTOL) system for an unmanned flying object, said system comprising:
   a suspension cable, suspended from said flying object;
   a latching element, coupled with said suspension cable;
   a beam, projecting horizontally and inclined laterally from a surface of a landing body, said beam being extendable and retractable;
   a receiving latch coupled with said beam and configured to latch with said latching element; and
   a cable release/retraction mechanism, operable for releasing and/or retracting said suspension cable,
   wherein said flying object is directed along at least one flight trajectory, said beam being laterally inclined forward along said flight trajectory, such that when said flying object approaches said landing body along said flight trajectory, said beam is configured to guide said latching element to engage with and latch onto said receiving latch, following which said cable release/retraction mechanism is configured to release and/or retract said suspension cable, and said beam is configured to retract and maneuver, so as to haul said flying object onto a landing surface coupled to said beam.

2. The PTOL system according to claim 1, wherein said cable release/retraction mechanism is configured to release and/or retract said suspension cable so as to turn around said flying object with respect to an initial flight trajectory, such that said flying object is facing an opposite direction from said initial flight trajectory upon landing.

3. The PTOL system according to claim 1, wherein said cable release/retraction mechanism is configured to release and/or retract said suspension cable so as to pull said flying object backwards, such that said flying object is facing the same direction as an initial flight trajectory upon landing.

4. The PTOL system according to claim 1, wherein said cable release/retraction mechanism is configured to release and/or retract said suspension cable so as to pull said flying object forward and down onto said landing surface, such that said flying object is facing the same direction as an initial flight trajectory upon landing.

5. The PTOL system according to claim 1, wherein said flight trajectory is selected from the list consisting of:
   approaching said landing body upwind;
   flying along a direction transverse to the wind direction or to the motion of said landing body;
   repetitively flying back and forth transverse to the wind direction or to the motion of said landing body;
   ascending and then gradually descending;
   repetitively ascending and descending; and
   a flight maneuver that extends the flight duration of said flying object, such that wind drift results in a lag between said flying object and said landing body that enables effective hauling down of said flying object onto said landing body by said suspension cable.

6. The PTOL system according to claim 1, wherein said flight trajectory is based on at least one characteristic selected from the list consisting of:
   parameters at the vicinity of said landing body;
   parameters of said flying object;
   parameters of said landing body; and
   current operational characteristics of components of said PTOL system.

7. The PTOL system according to claim 1, wherein said beam is stabilized, to minimize relative motion of said beam resulting from the motion of said landing body.

8. The PTOL system according to claim 1, wherein said landing body is an aquatic vessel.

9. The PTOL system according to claim 1, wherein said beam is pivotable about at least one axis.

10. The PTOL system according to claim 1, wherein said landing surface is pivotable about at least one axis.

11. The PTOL system according to claim 1, further comprising an elevator, operative for transporting said flying object within said landing body.

12. A method for point take-off and landing (PTOL) of the PTOL system for an unmanned flying object of claim 1, the method comprising the procedures of:
   directing said unmanned flying object along at least one flight trajectory, said beam being laterally inclined forward along said flight trajectory;
   guiding said latching element to engage with and latch onto said receiving latch, using the inclined beam, when said flying object approaches said landing body along said flight trajectory; and
   releasing and/or retracting said suspension cable with said cable release/retraction mechanism, and retracting and manuevering said beam, so as to haul said flying object onto said landing surface coupled to said beam.

13. The method according to claim 12, wherein said flight trajectory is selected from the list consisting of:
   approaching said landing body upwind;
   flying along a direction transverse to the wind direction or to the motion of said landing body;
   repetitively flying back and forth transverse to the wind direction or to the motion of said landing body;
   ascending and then gradually descending;
   repetitively ascending and descending; and
   a flight maneuver that extends the flight duration of said flying object, such that wind drift results in a lag between said flying object and said landing body that enables effective hauling down of said flying object onto said landing body by said suspension cable.

14. The method according to claim 12, wherein said flight trajectory is based on at least one characteristic selected from the list consisting of:
   parameters at the vicinity of said landing body;
   parameters of said flying object;
   parameters of said landing body; and
   current operational characteristics of components of said PTOL system.

* * * * *